(12) United States Patent
Michimata et al.

(10) Patent No.: US 10,382,714 B2
(45) Date of Patent: Aug. 13, 2019

(54) IMAGE CAPTURING APPARATUS AND MOVING OBJECT

(71) Applicant: CANON KABUSHIKI KAISHA, Tokyo (JP)

(72) Inventors: Kenji Michimata, Yokohama (JP); Tomoya Onishi, Ayase (JP)

(73) Assignee: Canon Kabushiki Kaisha, Tokyo (JP)

( * ) Notice: Subject to any disclaimer, the term of this patent is extended or adjusted under 35 U.S.C. 154(b) by 34 days.

(21) Appl. No.: 15/846,337

(22) Filed: Dec. 19, 2017

(65) Prior Publication Data

US 2018/0199000 A1 Jul. 12, 2018

(30) Foreign Application Priority Data

Jan. 10, 2017 (JP) .................................. 2017-002115

(51) Int. Cl.
*G06T 5/00* (2006.01)
*H04N 5/378* (2011.01)
(Continued)

(52) U.S. Cl.
CPC ........... *H04N 5/378* (2013.01); *G01S 7/4863* (2013.01); *G01S 17/023* (2013.01); *G01S 17/10* (2013.01);
(Continued)

(58) Field of Classification Search
CPC .... H04N 5/378; H04N 5/37452; H04N 5/374; H04N 5/2258; H04N 5/23245; H04N 7/181; H04N 5/36961; H04N 5/232933; H04N 5/37457; H04N 5/232122; H04N 5/232127; H04N 5/3696; H04N 5/3456; H04N 5/23212; H04N 5/3745;
(Continued)

(56) References Cited

U.S. PATENT DOCUMENTS 6,487,309 B1 * 11/2002 Chen ..................... H04N 9/045
348/E9.01
9,018,573 B2 4/2015 Kamiyama et al.
(Continued)

FOREIGN PATENT DOCUMENTS

| JP | 2008-116309 A | 5/2008 |
|----|---------------|--------|
| JP | 2012-217058 A | 11/2012 |
| JP | 2012-217060 A | 11/2012 |

OTHER PUBLICATIONS

U.S. Appl. No. 15/709,816, filed Sep. 20, 2017 (First Named Inventor: Maasa Ito).

*Primary Examiner* — Howard D Brown, Jr.
(74) *Attorney, Agent, or Firm* — Venable LLP

(57) ABSTRACT

An image capturing apparatus that includes a first and second image sensors each including pixel array and a driving unit, the driving units perform first driving, in a first period, such that a signal based on a light from non-irradiated object is held in a first signal holding unit of each of the first and second image sensors, second driving, in a second period, such that a signal based on a light from irradiated object is held in a second signal holding unit of the first image sensor, and third driving, in a third period, such that a signal based on a light from irradiated object is held in a second signal holding unit of the second image sensor, the third period including a period which does not overlap the second period.

10 Claims, 19 Drawing Sheets

(51) Int. Cl.
  *H04N 5/225* (2006.01)
  *H04N 5/374* (2011.01)
  *H04N 5/232* (2006.01)
  *H04N 7/18* (2006.01)
  *G01S 17/10* (2006.01)
  *G05D 1/02* (2006.01)
  *G06T 7/593* (2017.01)
  *G01S 17/02* (2006.01)
  *G01S 17/46* (2006.01)
  *G01S 17/89* (2006.01)
  *G01S 17/93* (2006.01)
  *G01S 7/486* (2006.01)
  *H04N 5/3745* (2011.01)
  *B60R 11/04* (2006.01)

(52) U.S. Cl.
  CPC .............. *G01S 17/46* (2013.01); *G01S 17/89* (2013.01); *G01S 17/936* (2013.01); *G05D 1/0253* (2013.01); *G06T 7/593* (2017.01); *H04N 5/2258* (2013.01); *H04N 5/23245* (2013.01); *H04N 5/374* (2013.01); *H04N 5/37452* (2013.01); *H04N 7/181* (2013.01); *B60R 11/04* (2013.01); *G06T 2207/10012* (2013.01); *G06T 2207/30261* (2013.01)

(58) Field of Classification Search
  CPC ..... H04N 5/23219; G01S 17/46; G01S 17/89; G01S 17/936; G01S 17/023; G01S 7/4863; G01S 17/10; G06T 7/593; G06T 2207/10012; G06T 2207/30261; G05D 1/0253; B60R 11/04; G02B 7/34; G03B 13/36

See application file for complete search history.

(56) References Cited

U.S. PATENT DOCUMENTS

| | | |
|---|---|---|
| 9,142,575 B2 | 9/2015 | Kobayashi et al. |
| 2008/0137972 A1* | 6/2008 | Yamada .................... G06T 1/20 382/232 |
| 2012/0248290 A1 | 10/2012 | Kamiyama et al. |
| 2013/0188026 A1* | 7/2013 | Hiramoto ............... G01B 11/24 348/49 |
| 2015/0319384 A1 | 11/2015 | Onishi |
| 2016/0050381 A1 | 2/2016 | Onishi et al. |
| 2016/0198110 A1* | 7/2016 | Ikedo ..................... H04N 5/378 348/231.99 |
| 2016/0273909 A1* | 9/2016 | Nobayashi ............. G01B 11/14 |
| 2016/0316112 A1* | 10/2016 | Tadano .................. G01S 17/107 |
| 2016/0330414 A1 | 11/2016 | Takado et al. |
| 2016/0344956 A1 | 11/2016 | Takado et al. |
| 2018/0367772 A1* | 12/2018 | Nobayashi ............. H04N 9/646 |

* cited by examiner

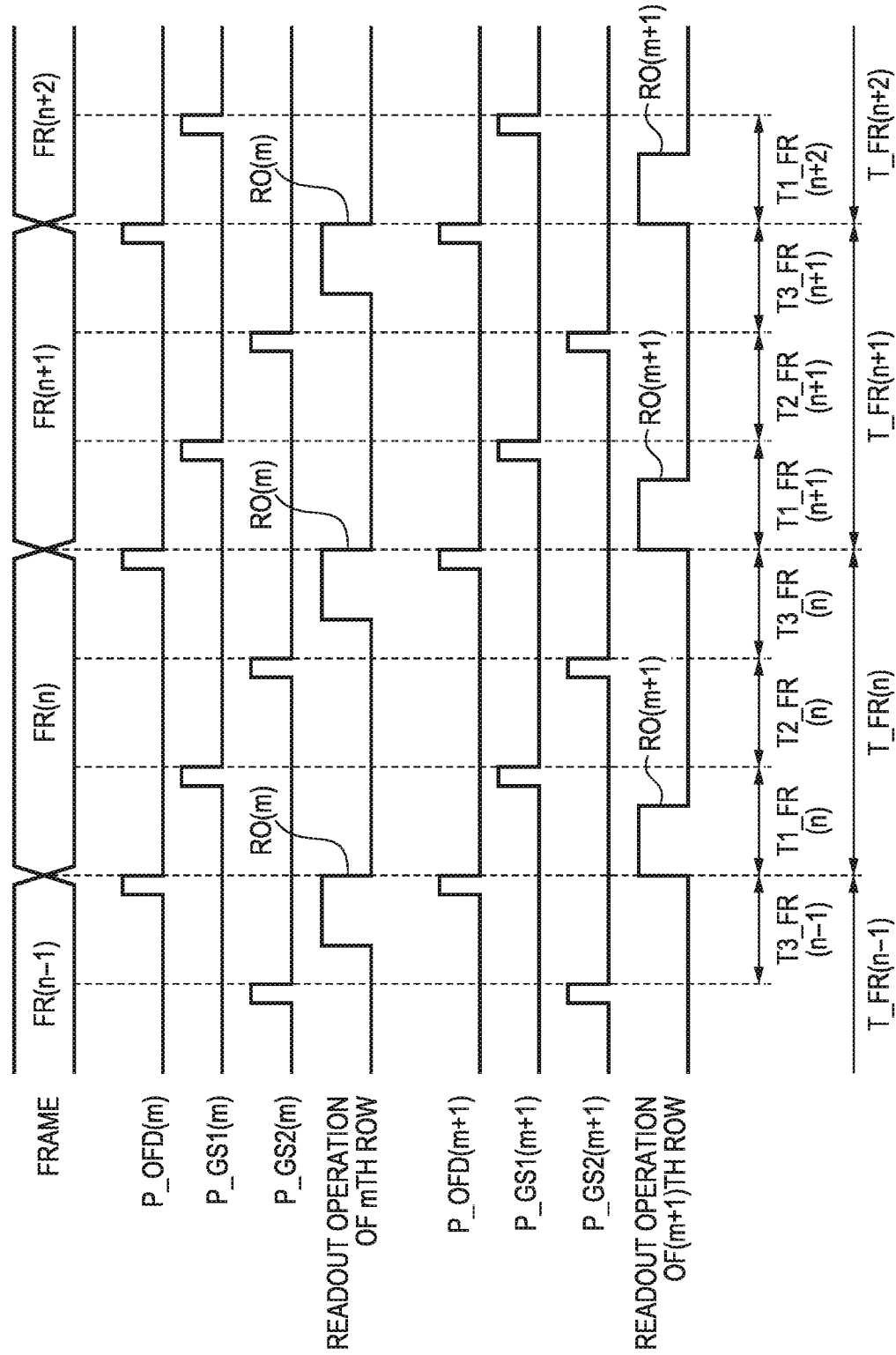

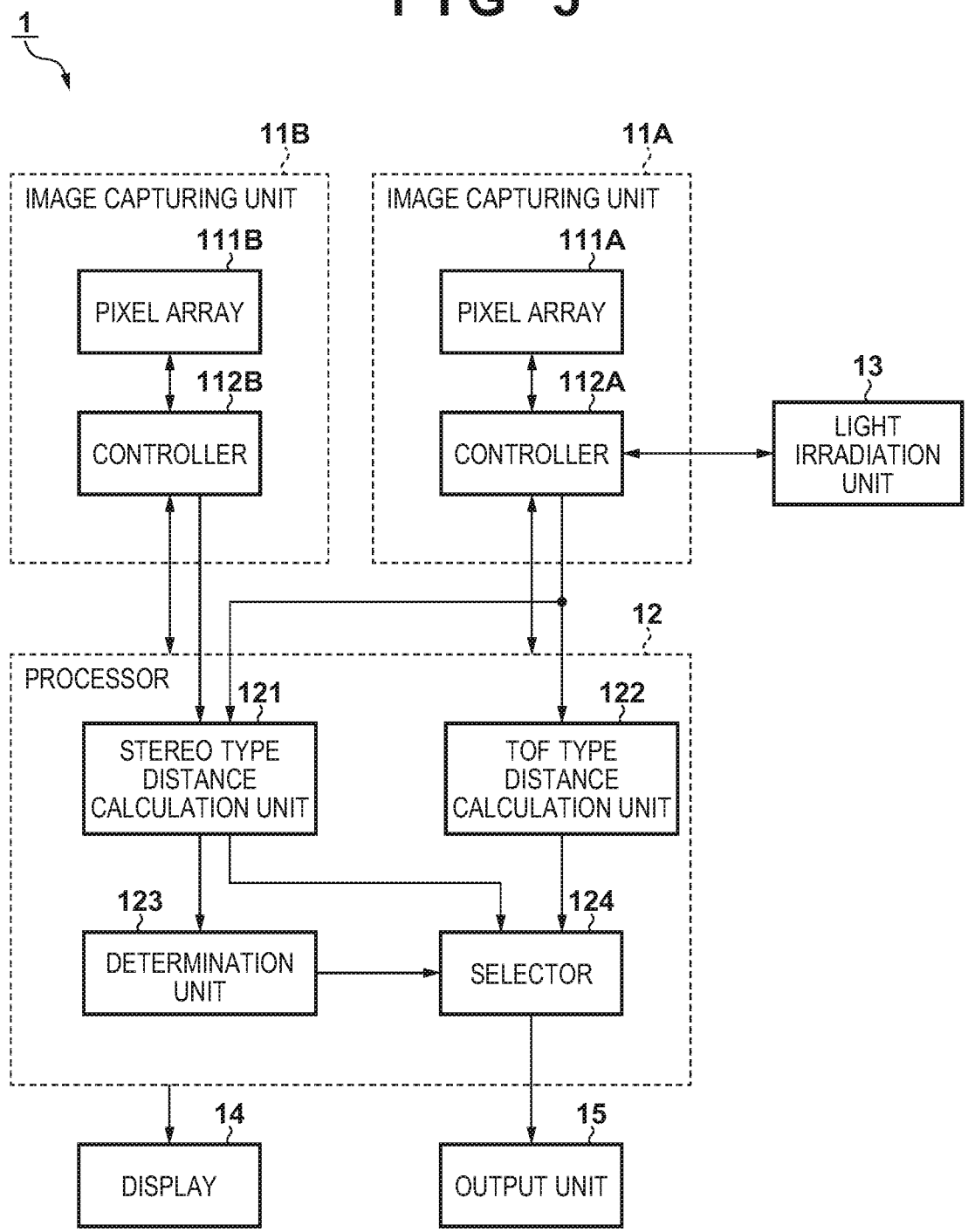

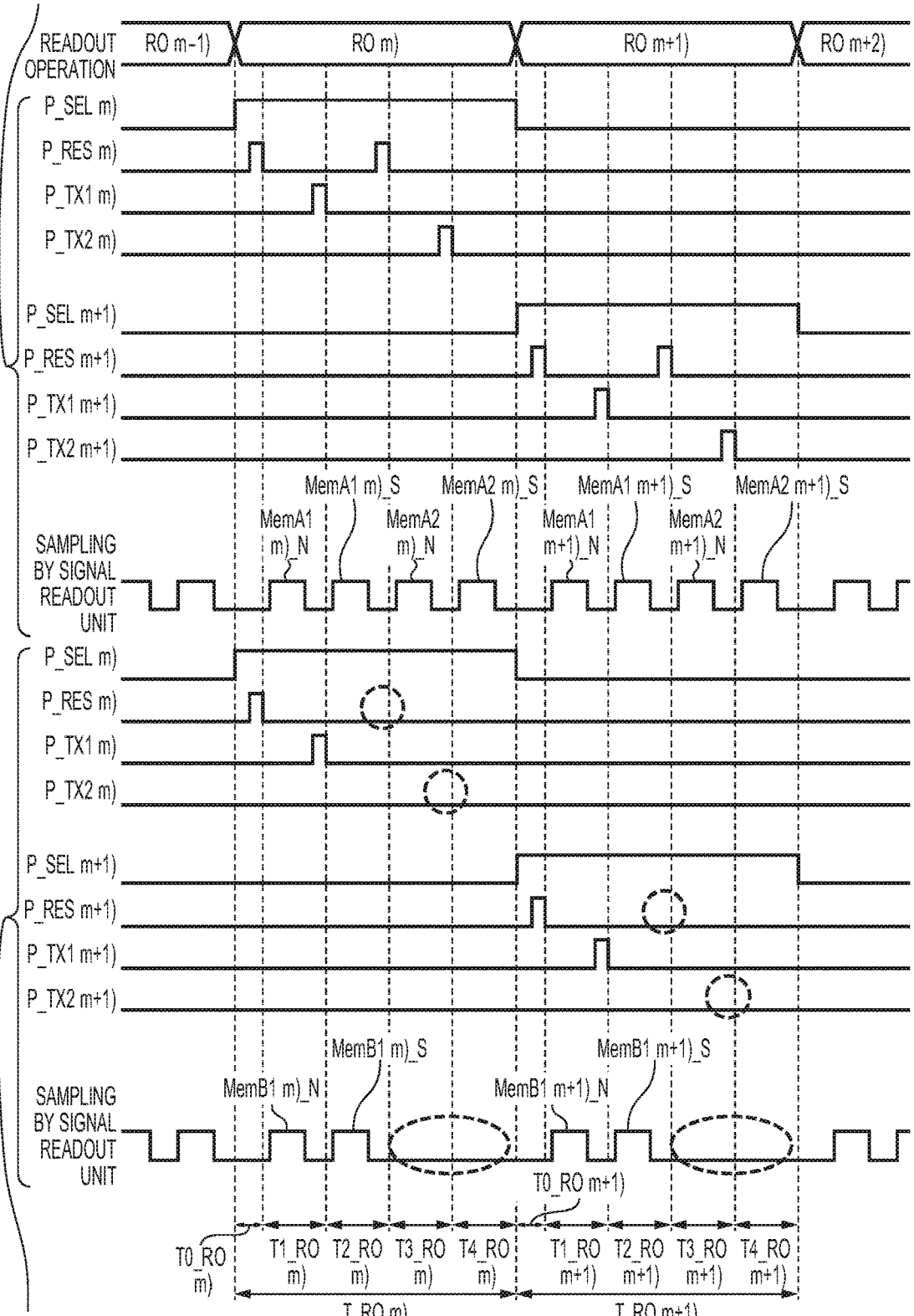

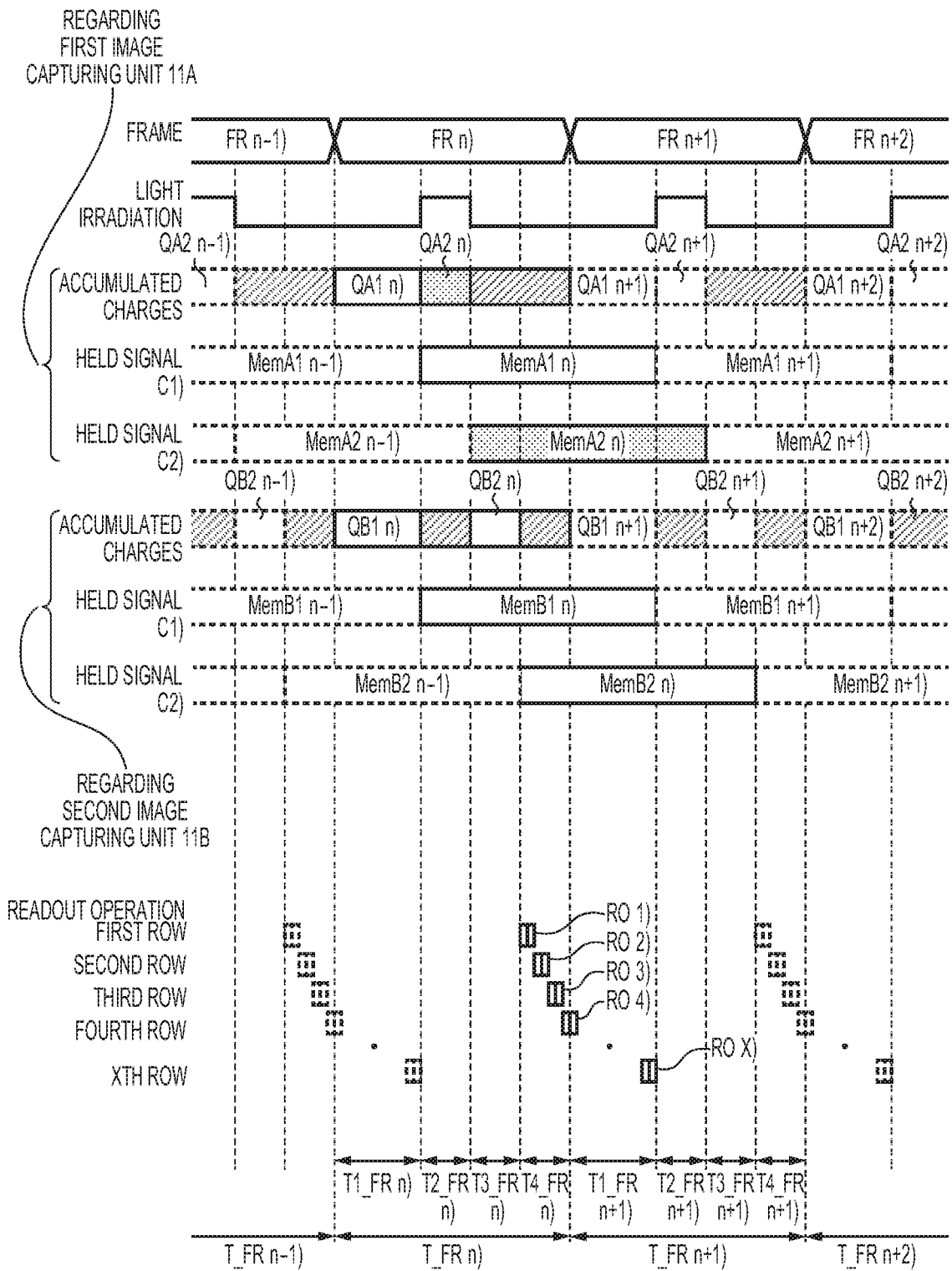

IMAGE CAPTURING APPARATUS AND MOVING OBJECT

BACKGROUND OF THE INVENTION

Field of the Invention

The present invention relates to an image capturing apparatus and a moving object.

Description of the Related Art

Some image capturing apparatuses each including an image sensor read out both image signals each indicating the shape or the like of an object, and distance signals each indicating a distance between the object and the image capturing apparatus (see Japanese Patent Laid-Open No. 2008-116309). A TOF (Time Of Flight) method is used as an example of a method of measuring the distance between the object and the image capturing apparatus. According to this method, the object is irradiated with light, and then reflected light from the object is detected, making it possible to measure the distance between the object and the image capturing apparatus based on a time difference (delay time) from the timing of light irradiation to the timing of reflected light detection. Such an image capturing apparatus is applied to, for example, a vehicle-mounted camera, and used to detect an obstacle around a vehicle and a distance between the obstacle and the vehicle.

The image capturing apparatus includes a plurality of pixels each including a photoelectric conversion element such as a photodiode. Note that in order to associate the shape or the like of a given object with a distance between the object and the image capturing apparatus appropriately, both the image signal and distance signal described above are preferably read out from the same pixel (same photoelectric conversion element).

SUMMARY OF THE INVENTION

The present invention provides a new technique of obtaining both an image signal and a distance signal from the same pixel appropriately.

One of the aspects of the present invention provides an image capturing apparatus that includes a first image sensor and a second image sensor each including a plurality of pixels arrayed in a matrix, a driving unit, and a signal readout unit, wherein each of the plurality of pixels includes a photoelectric conversion element, a first signal holding unit, a first transferring unit configured to transfer a signal according to an amount of charges generated in the photoelectric conversion element to the first signal holding unit, a second signal holding unit, and a second transferring unit configured to transfer a signal according to an amount of charges generated in the photoelectric conversion element to the second signal holding unit, and the driving units perform, on each of the first image sensor and the second image sensor, first driving of causing the first transferring unit to transfer, to the first signal holding unit, a signal according to an amount of charges generated in the photoelectric conversion element in a first period in accordance with an amount of light from an object which is not irradiated with light by a light irradiation unit, and causing the first signal holding unit to hold the signal as an image signal, perform, on the first image sensor, second driving of causing the second transferring unit to hold, in the second signal holding unit, a signal generated in the photoelectric conversion element in a second period based on reflected light from the object irradiated with the light by the light irradiation unit, and perform, on the second image sensor, third driving of causing the second transferring unit to hold, in the second signal holding unit, a signal generated in the photoelectric conversion element in a third period based on reflected light from the object irradiated with the light by the light irradiation unit, the third period including a period which does not overlap the second period.

Further features of the present invention will become apparent from the following description of exemplary embodiments with reference to the attached drawings.

BRIEF DESCRIPTION OF THE DRAWINGS

FIGS. 4A and 4B are timing charts for explaining the example of the method of driving the pixels;

FIG. 5 is a block diagram for explaining an example of the arrangement of an image capturing apparatus;

FIGS. 8A and 8B are timing charts for explaining the example of the method of driving the pixels;

FIG. 9 is a timing chart for explaining an example of a method of driving pixels;

DESCRIPTION OF THE EMBODIMENTS

Figure 1:
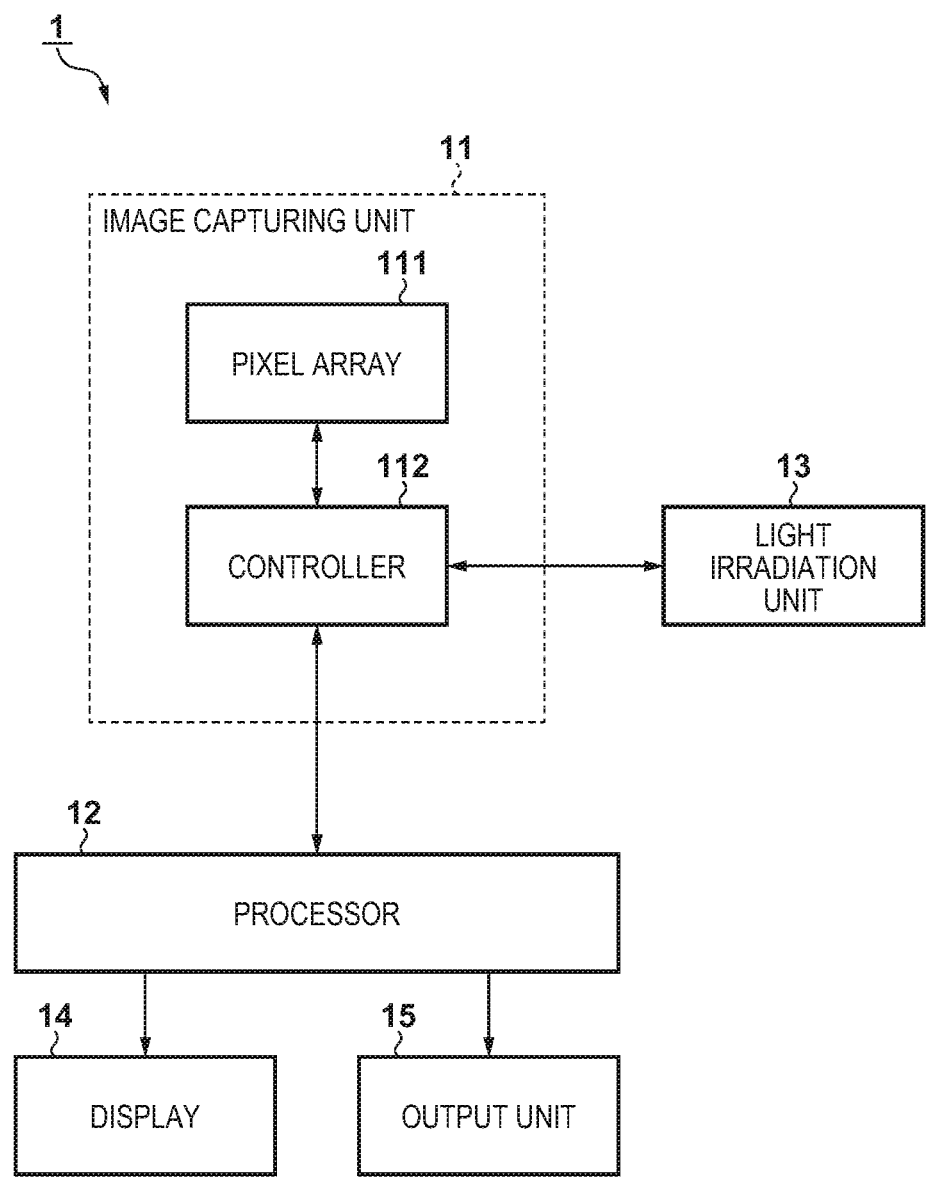
FIG. 1 is a block diagram for explaining an example of the arrangement of an image capturing apparatus.

Preferred embodiments of the present invention will now be described with reference to the accompanying drawings. Note that the drawings are illustrated for the purpose of only explaining a structure or an arrangement, and the sizes of illustrated members do not always reflect actual sizes. The same reference numerals denote the same members or the same constituent elements throughout the drawings, and a description of repetitive contents will be omitted hereinafter.

First Embodiment

An image capturing apparatus (image capturing system) 1 of the first embodiment will be described with reference to FIGS. 1 to 4B. FIG. 1 is a block diagram showing an example of the arrangement of the image capturing apparatus 1. The image capturing apparatus 1 includes an image capturing unit 11, a processor 12, a light irradiation unit 13, a display 14, and an output unit 15.

The image capturing unit 11 includes a pixel array 111 and a controller 112. The processor 12 can communicate with the controller 112 and obtains image data of an object (not shown) by controlling the pixel array 111 by the controller 112, as will be described later in detail.

In this embodiment, the controller 112 can also control the light irradiation unit 13 to irradiate the object with light. As will be described later in detail, the processor 12 can perform distance measurement according to a TOF (Time Of Flight) method based on reflected light from the object receiving light of the light irradiation unit 13, in addition to obtaining the image data of the object by using the image capturing unit 11. That is, the processor 12 obtains a distance with the object based on a time difference between a timing at which the light irradiation unit 13 irradiates the object and a timing at which the reflected light from the object is detected. Therefore, the controller 112 controls the light irradiation unit 13 based on a control signal from the processor 12. In other words, the processor 12 is configured to control the light irradiation unit 13 by the controller 112. Note that the distance with the object is a distance from the image capturing apparatus 1 (in particular, the image capturing unit 11) to the object in this embodiment.

The processor 12 can display an image (for example, a video such as a moving image) based on image data obtained from the image capturing unit 11 on the display 14. A known display device such as a liquid crystal display or an organic EL display can be used for the display 14. Together with this, the processor 12 causes the output unit 15 to output a signal indicating the distance with the object obtained based on the above-described TOF method to an arithmetic unit (for example, a CPU (Central Processing Unit)) that performs a predetermined process based on the signal. Alternatively, the output unit 15 may be integrated with the display 14 and, for example, the distance with the object may be displayed together with the object on the display 14.

The processor 12 may be, for example, a device (for example, a PLD (Programmable Logic Device) such as an FPGA (Field Programmable Gate Array) or an integrated circuit capable of programming respective functions. Alternatively, the processor 12 may be an arithmetic device such as an MPU (Micro Processing Unit) or a DSP (Digital Signal Processor) for implementing the respective functions. Alternatively, the processor 12 may be an ASIC (Application Specific Integrated Circuit) or the like. Alternatively, the processor 12 includes a CPU and a memory, and the respective functions may be implemented on software. That is, the functions of the processor 12 can be implemented by hardware and/or software.

Figure 2A:
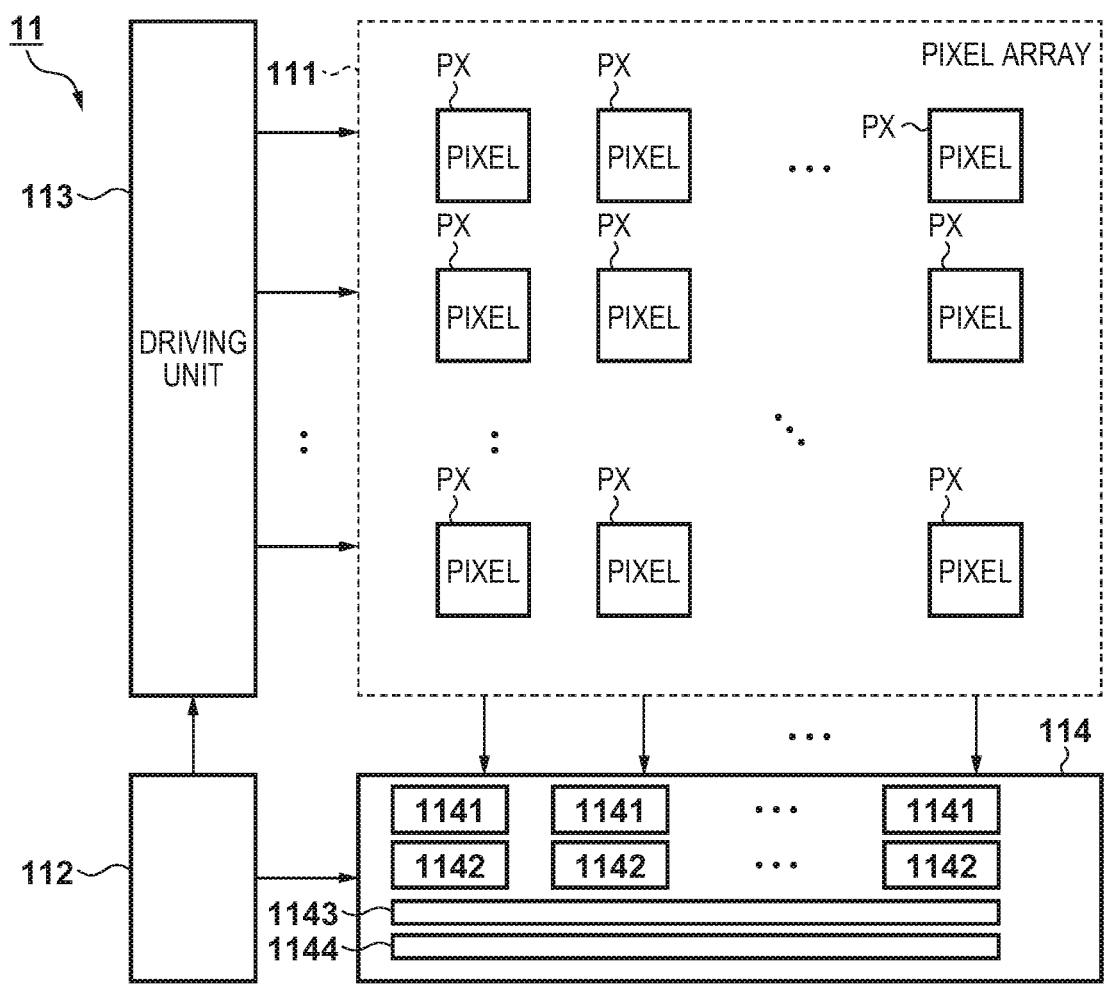
FIGS. 2A and 2B are a block diagram and a circuit diagram for explaining an example the arrangement of an image capturing unit.

FIG. 2A shows an example of the image capturing unit 11. The image capturing unit 11 further includes a driving unit 113 and a signal readout unit 114, in addition to the pixel array 111 and the controller 112. The pixel array 111 includes a plurality of pixels PX arrayed in a matrix (so as to form a plurality of rows and a plurality of columns). In this embodiment, the driving unit 113 is a vertical scanning circuit formed by a decoder, a shift register, or the like and drives the plurality of pixels PX for each row. The signal readout unit 114 includes a signal amplifier circuit 1141 and a sampling circuit 1142 arranged for each column, a multiplexer 1143, and a horizontal scanning circuit 1144 formed by a decoder, a shift register, or the like. With such an arrangement, the signal readout unit 114 reads out signals for each column from the plurality of pixels PX driven by the driving unit 113. As will be described later in detail, CDS (Correlated Double Sampling) processing is used in sampling by the sampling circuits 1142. The controller 112 includes a timing generator, and performs the synchronous control of the pixels PX, driving unit 113, and signal readout unit 114.

Figure 2B:
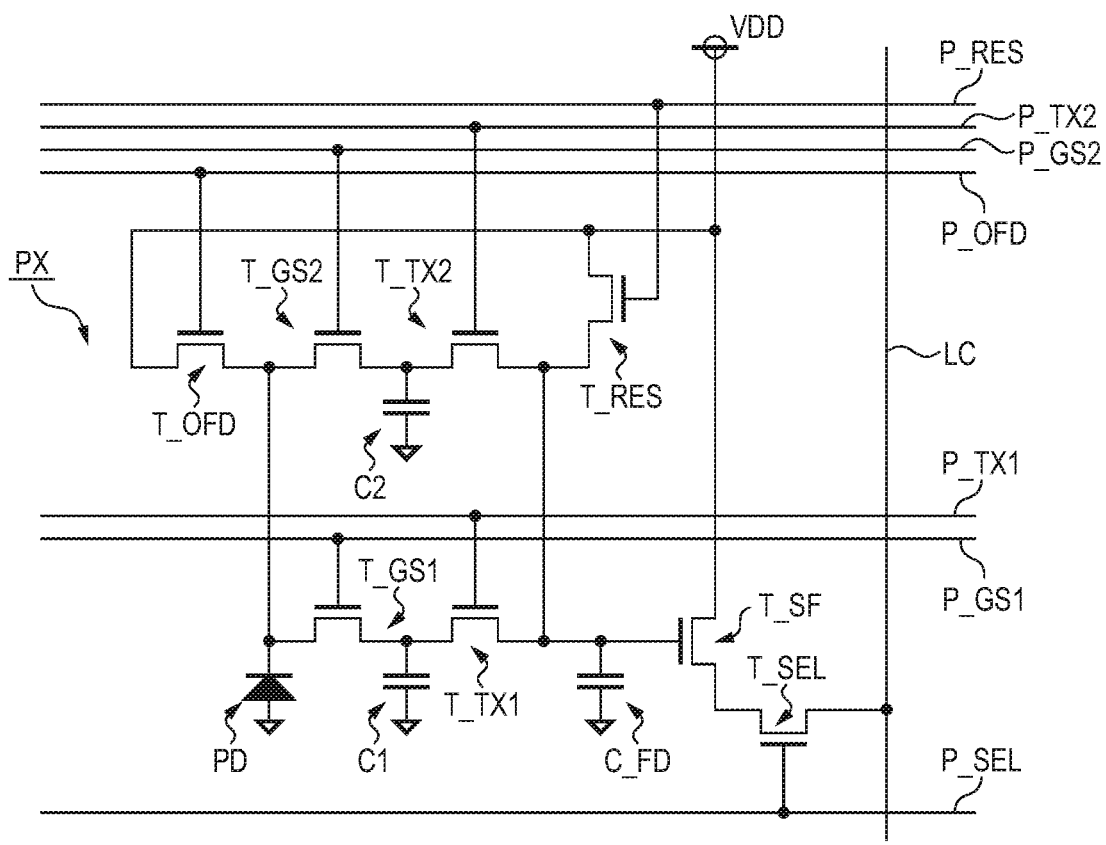

FIG. 2B shows an example of the circuit arrangement of the unit pixel PX. The pixel PX includes the photoelectric conversion element PD, various transistors T_GS1, T_GS2, T_TX1, T_TX2, T_OFD, T_RES, T_SF, and T_SEL, and capacitors C1, C2, and C_FD. In this embodiment, a photodiode is used for the photoelectric conversion element PD. However, another known photodetection element may be used. In this embodiment, NMOS transistors are used for the transistors T_GS1, T_GS2, T_TX1, T_TX2, T_OFD, T_RES, T_SF, and T_SEL. However, other known switch elements may be used. The capacitors C1, C2, and C_FD correspond to capacitance components of the diffusion layer regions (drains/sources) of the NMOS transistors.

The photoelectric conversion element PD is arranged such that one terminal is connected to the drain of the transistor T_GS1, the drain of the transistor T_GS2, and the source of the transistor T_OFD, and the other terminal is grounded. The source of the transistor T_GS1 and the drain of the transistor T_TX1 are connected to each other, and the capacitor C1 is formed in their connection node. Similarly, the source of the transistor T_GS2 and the drain of the transistor T_TX2 are connected to each other, and the capacitor C2 is formed in their connection node. The drain of the transistor T_OFD is connected to a power supply voltage VDD.

The source of the transistor T_TX1, the source of the transistor T_TX2, the source of the transistor T_RES, and the gate of the transistor T_SF are connected to each other, and the capacitor C_FD is formed in their connection node. The drain of the transistor T_RES and the drain of the transistor T_SF are connected to the power supply voltage VDD. The source of the transistor T_SF is connected to the drain of the transistor T_SEL. The source of the transistor T_SEL is connected to a column signal line LC for outputting the signal of the pixel PX.

Upon receiving a control signal P_GS1 at the gate, the transistor T_GS1 is controlled in a conductive state (ON) or a non-conductive state (OFF). In this embodiment, the transistor T_GS1 is turned on in the conductive state when the signal P_GS1 is set at high level (H level) and is turned off in the non-conductive state when the signal P_GS1 is set at low level (L level). Similarly, upon receiving a control signal P_GS2 at the gate, the transistor T_GS2 is controlled in the conductive state or the non-conductive state. Similarly, the transistors T_TX1, T_TX2, T_OFD, T_RES, and T_SEL are, respectively, controlled by control signals P_TX1, P_TX2, P_OFD, P_RES, and P_SEL. The control signal P_GS1 and the like are supplied from the driving unit 113 to the respective pixels PX based on a synchronization signal of the controller 112.

The transistor T_GS1 functions as the first transferring unit that transfers charges generated in the photoelectric conversion element PD to the capacitor C1. The transistor T_GS2 functions as the second transferring unit that transfers charges generated in the photoelectric conversion element PD to the capacitor C2. The capacitor C1 functions as the first signal holding unit that holds a signal (voltage) according to the amount of the charges generated in the photoelectric conversion element PD. Similarly, the capacitor C2 functions as the second signal holding unit. The transistor T_TX1 functions as the third transferring unit that transfers the signal of the capacitor C1 to the capacitor C_FD (capacitance unit). The transistor T_TX2 functions as the fourth transferring unit that transfers the signal of the capacitor C2 to the capacitor C_FD.

The transistor T_RES is also referred to as a reset transistor and functions as a reset unit that resets the voltage of the capacitor C_FD. The transistor T_SF is also referred to as an amplification transistor and functions as a signal amplifying unit that performs a source follower operation. The transistor T_SEL is also referred to as a selection transistor, capable of outputting a signal according to the voltage of the source of the transistor T_SF to the column signal line LC as a pixel signal, and functions as a selection unit that selects whether to output the pixel signal. The transistor T_OFD is also referred to as an overflow drain transistor and functions as an overflow drain unit that ejects (discharges) the charges generated in the photoelectric conversion element PD. Alternatively, it can also be said that the transistor T_OFD functions as the second reset unit that resets the voltage of the photoelectric conversion element PD.

The respective elements of the image capturing unit 11 may be formed by semiconductor chips, and the image capturing unit 11 may be referred to as an image sensor. Note that in this embodiment, the image capturing unit 11 is a CMOS image sensor. As another embodiment, however, a CCD image sensor may be used.

Figure 3:
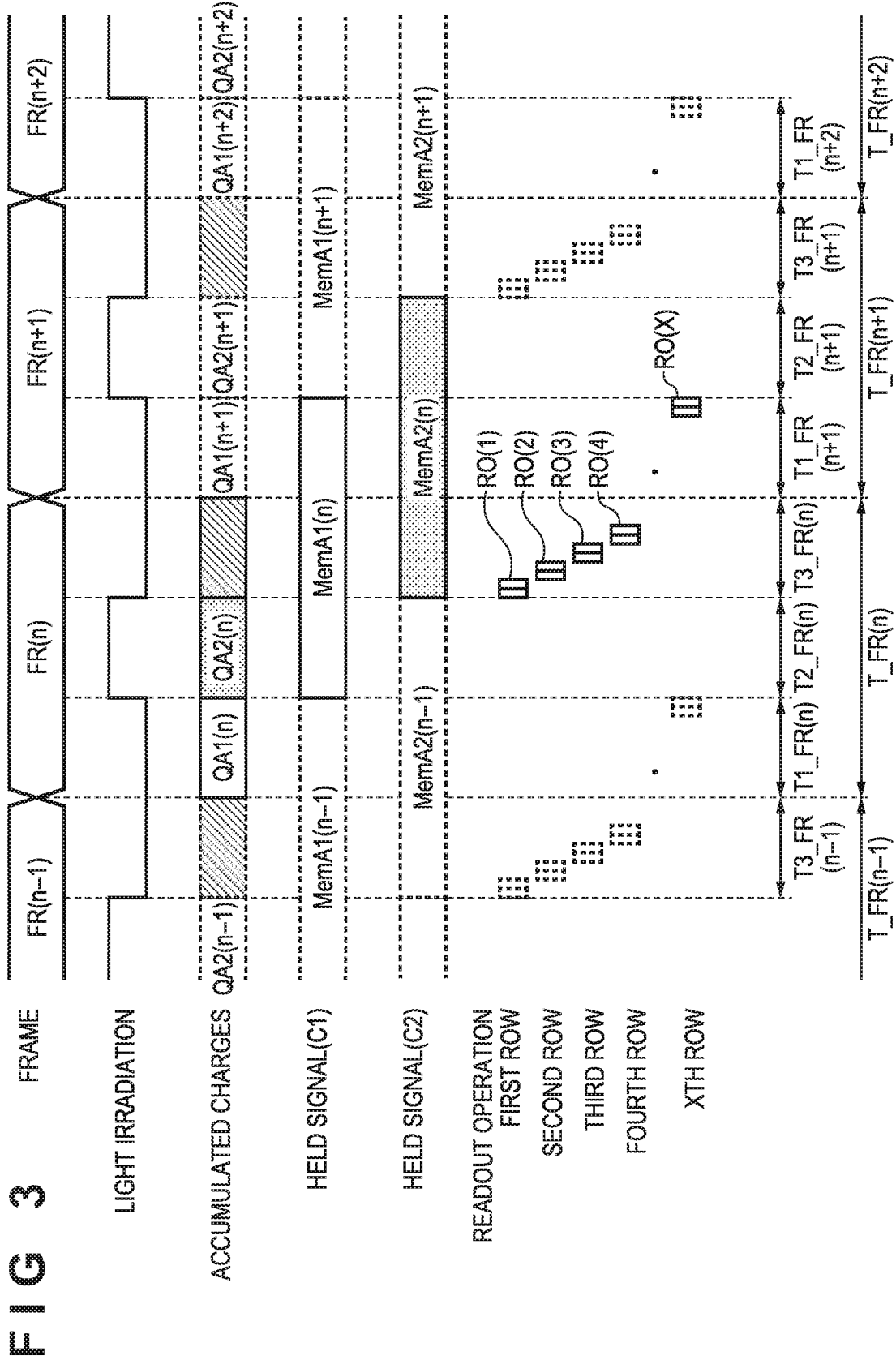
FIG. 3 is a timing chart for explaining an example of a method of driving pixels.

FIG. 3 is a timing chart showing an example of a method of driving the pixels PX according to this embodiment. In FIG. 3, the abscissa indicates a time axis. A "frame" indicated in the ordinate corresponds to image data (frame data) of one still image which is formed based on the group of pixel signals obtained from all the plurality of pixels PX. In this embodiment, assuming that a moving image is shot, this frame data is obtained repeatedly. In FIG. 3, FR(n) denotes the nth frame data. Frame data FR(n−1), FR(n+1), and FR(n+2) as frame data before and after the frame data FR(n) are illustrated additionally for understanding.

Note that periods for reading out the frame data FR(n−1), FR(n), FR(n+1), and FR(n+2) are, respectively, periods T_FR(n−1), T_FR(n), T_FR(n+1), and T_FR(n+2).

"Light irradiation" indicated in the ordinate indicates the state (active/inactive) of the light irradiation unit 13 configured to irradiate an object with light. More specifically, light irradiation at H level indicates that the light irradiation unit 13 is active (light irradiation state), and light irradiation at L level indicates that the light irradiation unit 13 is inactive (light non-irradiation state).

"Accumulated charges" indicated in the ordinate indicate charges generated and accumulated in the photoelectric conversion element PD, and reference symbols in FIG. 3 denote accumulated charge amounts in given periods. For example, "QA1(n)" denotes an amount of the charges accumulated in the photoelectric conversion element PD in the period T1_FR(n).

A "held signal (C1)" indicated in the ordinate indicates a signal held in the capacitor C1, and its signal level is a voltage value corresponding to a charge amount transferred from the photoelectric conversion element PD by the transistor T_GS1. Similarly, a "held signal (C2)" indicates a signal held in the capacitor C2, and its signal level is a voltage value corresponding to a charge amount transferred from the photoelectric conversion element PD by the transistor T_GS2.

"Readout operations" indicated in the ordinate indicate signal readout modes for each row from the plurality of pixels PX, and each block illustrated together with reference symbol indicates that a signal readout for a given row is performed. For example, a block denoted by "ROW" indicates that a signal readout is performed on the pixels PX of the first row. Note that in this embodiment, the number of rows in the pixel array 111 is X (natural number equal to or larger than 2) (reference symbols from RX(1) to RO(X) are illustrated).

The readout operation of the frame data FR(n) is focused below for a descriptive convenience. However, the same also applies to the other frame data FR(n+1) and the like. Note that in order to facilitate understanding of the drawing, regarding the "accumulated charges", "held signal (C1)", "held signal (C2)", and "readout operation", portions related to the readout operation of the frame data FR(n) are illustrated by solid lines, and portions other than these are illustrated by broken lines.

The period T_FR(n) for reading out the frame data FR(n) includes the period T1_FR(n), and periods T2_FR(n) and T3_FR(n). In the period T1_FR(n), charges are accumulated in the photoelectric conversion element PD in the light non-irradiation state (light irradiation: L level). The accumulated charges QA1(n) in the period T1_FR(n) are based on the amount of light from the object and entering the pixels PX. Then, at the last timing in the period T1_FR(n), a signal MemA1(n) corresponding to the accumulated charges QA1(n) is held in the capacitor C1. Note that the signal MemA1(n) is held over the periods T2_FR(n), T3_FR(n), and T1_FR(n+1).

In the period T2_FR(n), charges are accumulated in the photoelectric conversion element PD in a light irradiation state (light irradiation: H level). Accumulated charges QA2(n) in the period T2_FR(n) are based on the amount of light which is reflected from the object irradiated with light by the light irradiation unit 13 and enters the pixels PX. Note that not only this reflected light but also light in a case in which light irradiation is not performed enters the pixels PX. Therefore, it should be noted that the accumulated charges QA2(n) include not only a component according to the amount of this reflected light but also a component other than this. Then, at the last timing in the period T2_FR(n), a signal MemA2(n) corresponding to the accumulated charges QA2(n) is held in the capacitor C2. Note that the signal MemA2(n) is held over the periods T3_FR(n) and T1_FR(n+1), and a period T2_FR(n+1).

Note that the reflected light from the object is detected in the pixels PX with a delay according to a distance with the object from a light irradiation timing. Therefore, for example, as the distance with the object increases, the accumulated charges QA2(n) and the signal MemA2(n) corresponding to it become smaller. On the other hand, as this distance decreases, the accumulated charges QA2(n) and the signal MemA2(n) become larger.

As will be described later in detail, in the period T3_FR(n), the readout operations are started, and the operations from the signal readout RO(1) for the first row to the signal readout RO(X) for the Xth row are performed sequentially. These readout operations are performed between the periods T3_FR(n) and T1_FR(n+1) in which both the signals MemA1(n) and MemA2(n) are held in the capacitors C1 and C2, respectively.

The processor 12 described with reference to FIG. 1 can obtain image data and distance information based on the signals MemA1(n) and MemA2(n) read out as described above. The processor 12 obtains the signal MemA1(n) as an image signal indicating the shape or the like of the object. The processor 12 also obtains the signal MemA2(n) as a distance signal indicating the distance with the object. Note that as described above, the accumulated charges QA2(n) as the origin of the signal MemA2(n) include not only a component according to the amount of the reflected light from the object irradiated by the light irradiation unit 13 but also a component other than this. Therefore, in this embodiment, the processor 12 subtracts the signal MemA1($n$) from the signal MemA2($n$) (removes a signal component corresponding to a case in which light irradiation is not performed by the light irradiation unit 13 from the signal MemA2($n$)) and based on that result, calculates the distance with the object.

Note that as will be described later in detail, charges are not accumulated in the photoelectric conversion element PD in the period T3_FR(n). More specifically, the charges generated in the photoelectric conversion element PD in the period T3_FR(n) are ejected (discharged) by the transistor T_OFD. That is, the "accumulated charges" in the period T3_FR(n) are discarded by an overflow drain operation (OFD operation) and are indicated by stripe hatching in FIG. 3 (ditto for the other drawings described in embodiments to be described later).

FIG. 4A is a timing chart for explaining the method of driving the pixels PX in FIG. 3 in detail. For a descriptive convenience, the pixels PX of the mth row and (m+1)th row are focused here. However, the same also applies to other rows.

"P_OFD(m)", "P_GS1($m$)", and "P_GS2($m$)" indicated in the ordinate, respectively, denote control signals for controlling the transistors T_OFD, T_GS1, and T_GS2 of the pixels PX of the mth row (see FIG. 2B). Similarly, "P_OFD(m+1)", "P_GS1($m$+1)", and "P_GS2($m$+1)" correspond to control signals for the (m+1)th row. A "readout operation of the mth row" indicates that the signal readout RO(m) is being performed for H level, and the signal readout RO(m) is not being performed for L level. The same also applies to a "readout operation of the (m+1)th row".

Before the period T1_FR(n) starts, that is, at the last timing of a period T3_FR(n−1), a pulse at H level is given to the signal P_OFD(m), resetting the photoelectric conversion element PD. Subsequently (after the signal P_OFD(m) is returned to L level), charges are generated and accumulated in the photoelectric conversion element PD. At the last timing in the period T1_FR(n), a pulse at H level is given to the signal P_GS1($m$), holding the signal MemA1($n$) corresponding to the accumulated charges QA1($n$) in the period T1_FR(n) by the capacitor C1 as the image signal.

Subsequently (after the signal P_GS1($m$) is returned to L level), charges are generated and accumulated again in the photoelectric conversion element PD in the period T2_FR(n). As described above, light irradiation by the light irradiation unit 13 is performed in the period T2_FR(n). At the last timing in the period T2_FR(n), a pulse at H level is given to the signal P_GS2($m$), holding the signal MemA2($n$) corresponding to the accumulated charges QA2($n$) in the period T2_FR(n) by the capacitor C2 as the distance signal.

Control in the above-described periods T1_FR(n) and T2_FR(n) is shown only for the (m+1)th row in FIG. 4A. However, the control is performed at once in all the rows. That is, in all the plurality of pixels PX of the pixel array 111, the signals MemA1($n$) are held in the capacitors C1 almost simultaneously, and the signals MemA2($n$) are also held in the capacitors C2 almost simultaneously. This makes it possible to equalize charge accumulation times for all the pixels PX and to implement a so-called global electronic shutter.

Subsequently, in the period T3_FR(n), the readout operations from the first row to the Xth row, that is, the signal readouts RO(1) to RO(X) are performed sequentially. The signal readouts RO(1) to RO(X) are performed in the order of a row number here. However, the signal readouts RO(1) to RO(X) may be performed in any order because the charge accumulation times are equalized for all the pixels PX, and the accumulated charges are held in the capacitors C1 and C2. The signal readouts RO(m) and RO(m+1) are illustrated separately from each other at a boundary between the period T3_FR(n) and the period T1_FR(n+1). However, they may be performed at any timing between the periods T3_FR(n) and T1_FR(n+1).

Figure 4B:
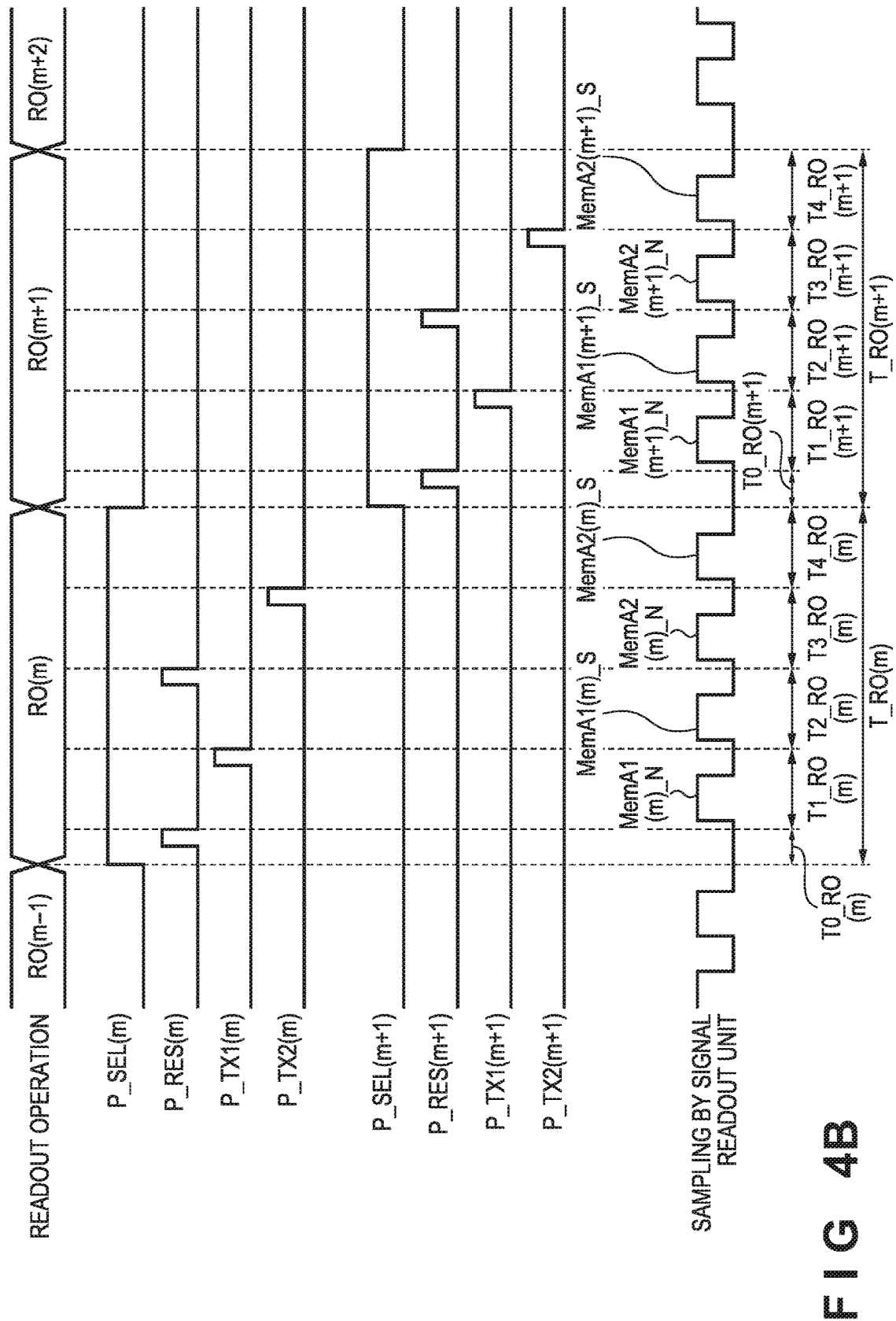

FIG. 4B is a timing chart for explaining the method of driving the pixels PX when the signal readouts RO(m) and RO(m+1) are performed in detail. "P_SEL(m)", "P_RES(m)", "P_TX1($m$)", and "P_TX2($m$)" indicated in the ordinate, respectively, denote control signals for controlling the transistors T_SEL, T_RES, T_TX1, and T_TX2 of the pixels PX of the mth row. Similarly, "P_SEL(m+1)", "P_RES(m+1)", "P_TX1($m$+1)", and "P_TX2($m$+2)" correspond to control signals for the (m+1)th row.

"Sampling by the signal readout unit" indicates that sampling by the sampling circuits 1142 is being performed in the signal readout unit 114 for H level, and the sampling is not being performed for L level. As described above (see FIG. 2A), the signal readout unit 114 reads out the signals from the pixels PX for each row. Thus, when the signal readout unit 114 reads out the signals from the pixels PX of a given row, "sampling by the signal readout unit" at H level described above indicates that the signals from the pixels PX of the row are sampled.

Periods for performing the signal readouts RO(m) and RO(m+1) are, respectively, periods T_RO(m) and T_RO(m+1). First, the period T_RO(m) will be described. The control signal P_SEL(m) is maintained at H level during the period T_RO(m). The period T_RO(m) includes periods T0_RO(m), T1_RO(m), T2_RO(m), T3_RO(m), and T4_RO(m).

As described with reference to FIG. 2A, CDS processing is performed in the signal readout unit 114. More specifically, after a pulse at H level is given to the control signal P_RES(m) in the period T0_RO(m), and the capacitor C_FD is reset, the voltage of the reset capacitor C_FD is sampled in the period T1_RO(m). "MemA1($m$)_N" denotes a signal obtained by this.

After completion of this sampling, a pulse at H level is given to the control signal P_TX1($m$) at the last timing in the period T1_RO(m), and the transistor T_TX1 transfers a signal MemA1($m$) from the capacitor C1 to the capacitor C_FD. Subsequently, in the period T2_RO(m), the voltage of the capacitor C_FD to which the signal MemA1($m$) is transferred is sampled. "MemA1($m$)_S" denotes a signal obtained by this.

In CDS processing, a difference between the signal MemA1($m$)_N and the signal MemA1($m$)_S thus obtained is obtained, removing an offset component caused by a circuit arrangement, characteristic variations, or the like. In the description of FIG. 3 above, the signal MemA1($n$) is obtained as the image signal for a descriptive convenience. In this embodiment, however, this image signal is obtained in practice based on the above-described CDS processing using the signals MemA1($m$)_N and MemA1($m$)_S. That is, this image signal is a signal obtained by subtracting MemA1($m$)_N from MemA1($m$)_S.

Subsequently, after a pulse at H level is given to the control signal P_RES(m) at the last timing in the period T2_RO(m), and the capacitor C_FD is reset, the voltage of the reset capacitor C_FD is sampled in the period T3_RO(m). "MemA2($m$)_N" denotes a signal obtained by this.

After completion of this sampling, a pulse at H level is given to the control signal P_TX2 (*m*) at the last timing in the period T3_RO(m), and the transistor T_TX2 transfers a signal MemA2(*m*) from the capacitor C2 to the capacitor C_FD. Subsequently, in the period T4_RO(m), the voltage of the capacitor C_FD to which the signal MemA2(*m*) is transferred is sampled. "MemA2(*m*)_S" denotes a signal obtained by this.

Then, as in the signals MemA1(*m*)_N and MemA1(*m*)_S, a difference between the signal MemA2(*m*)_N and the signal MemA2(*m*)_S is obtained by CDS processing, removing the offset component. In the description of FIG. 3 above, the signal MemA2(*n*) is obtained as the distance signal for a descriptive convenience. In this embodiment, however, this distance signal is obtained in practice based on the above-described CDS processing using the signals MemA2(*m*)_N and MemA2(*m*)_S. That is, this distance signal is a signal obtained by subtracting MemA2 (*m*)_N from MemA2(*m*)_S.

Moreover, in the description of FIG. 3 above, the distance with the object is calculated based on a result of subtracting the signal MemA1(*n*) from the signal MemA2(*n*). Hence, this distance is calculated based on a result obtained by further subtracting the above-described image signal (the signal obtained by subtracting MemA1(*m*)_N from MemA1(*m*)_S) from the above-described distance signal (the signal obtained by subtracting MemA2(*m*)_N from MemA2(*m*)_S).

Note that in this embodiment, the period T1_FR(n) and the period T2_FR(n) are equal in length. Therefore, a signal component corresponding to a case in which the light irradiation unit 13 does not perform light irradiation is removed appropriately (that is, a signal component based on the TOF method is extracted appropriately) by the above-described subtractions, making it possible to detect information on the distance with the object accurately based on this distance signal.

The signal readout RO(m) is performed as described above.

In the next period T_RO(m+1), the control signal P_SEL (m) is maintained at H level, and the same control as in the period T_RO(m) is also performed for the (m+1)th row. The contents of an operation and control in periods T0_RO(m+1) to T4_RO(m+1) for the (m+1)th row, respectively, correspond to those in the periods T0_RO(m) to T4_RO(m) for the mth row. The signal readout RO(m+1) is thus performed.

According to this embodiment, it is possible to obtain both the image signal indicating the shape or the like of the object and the distance signal indicating the distance with the object almost simultaneously (while reading out frame data of one frame) from the same photoelectric conversion element PD of the same pixel PX. Therefore, it becomes possible to associate the shape or the like of the object with the distance with the object appropriately and to improve the detection accuracy of the object. For example, at the time of shooting a moving image, it becomes possible, while monitoring an object that may move, to detect a distance with the object almost simultaneously with this.

The image capturing apparatus 1 is applied to, for example, a vehicle (four-wheel vehicle or the like) that includes an advanced driver assistance system (ADAS) such as an automatic brake. Therefore, in this embodiment, the method of driving the pixels PX in shooting the moving image is exemplified. However, the contents of this embodiment are also applicable to a case in which a still image is shot, as a matter of course.

Second Embodiment

The second embodiment will be described with reference to FIGS. 5 to 8B. As shown in FIG. 5, in this embodiment, an image capturing apparatus 1 further includes a second image capturing unit 11B, in addition to an image capturing unit 11. In order to discriminate them from each other, the image capturing unit 11 described in the first embodiment is referred to as an "image capturing unit 11A". The image capturing units 11A and 11B are arranged side by side so as to be spaced apart from each other. The image capturing unit 11A and the image capturing unit 11B can be configured in the same manner. In order to discriminate them from each other, the aforementioned pixel array 111 and controller 112 are, respectively, denoted by "111A" and "112A" for the image capturing unit 11A, and "111B" and "112B" for the image capturing unit 11B.

In this embodiment, a light irradiation unit 13 irradiates an object with light based on control by the controller 112A. As another embodiment, however, the light irradiation unit 13 may be controlled by the controller 112B.

A processor 12 obtains image data from both the image capturing units 11A and 11B. This allows the processor 12 to perform, in addition to distance measurement by the TOF method described above, distance measurement by a stereo method using two frame data obtained from both the image capturing units 11A and 11B. That is, the processor 12 can measure a distance with the object based on a parallax between the image capturing units 11A and 11B.

For example, as described above in the first embodiment, upon obtaining frame data FR(n), the image capturing unit 11A outputs signals MemA1(*n*) and MemA2(*n*) to the processor 12. On the other hand, upon obtaining the frame data FR(n), the image capturing unit 11B outputs a signal MemB1(*n*) corresponding to the signal MemA1(*n*) of the image capturing unit 11A to the processor 12. Note that in this embodiment, the image capturing unit 11B does not output a signal corresponding to the signal MemA2(*n*).

The processor 12 includes a stereo-type distance calculation unit 121, a TOF-type distance calculation unit 122, a determination unit 123, and a selector 124. The distance calculation unit 121 receives the signal MemA1(*n*) from the image capturing unit 11A, receives the signal MemB1(*n*) from the image capturing unit 11B, and calculates a distance based on the stereo method using these signals MemA1(*n*) and MemB1(*n*). On the other hand, the distance calculation unit 122 receives both the signals MemA1(*n*) and MemA2(*n*) from the image capturing unit 11A, and calculates the distance based on the TOF method (see the first embodiment).

As will be described later in detail, upon receiving a calculation result of the distance calculation unit 121, the determination unit 123 determines whether the calculation result satisfies a predetermined condition and outputs the determination result to the selector 124. The calculation result of the distance calculation unit 121 and the calculation result of the distance calculation unit 122 can be input to the selector 124. Upon receiving the determination result of the determination unit 123, the selector 124 selects one of the calculation result of the distance calculation unit 121 and the calculation result of the distance calculation unit 122 based on this determination result, and outputs it to an output unit 15. Note that image data output to a display 14 can be formed by a group of image signals based on the signal MemA1(*n*) and/or the signal MemB1(*n*).

As described above, the function of the processor 12 can be implemented by hardware and/or software. Therefore, in this embodiment, the above-described elements 121 to 124 are shown as elements independent of each other for a descriptive purpose. However, the individual functions of these elements 121 to 124 may be implemented by a single element.

Figure 6:
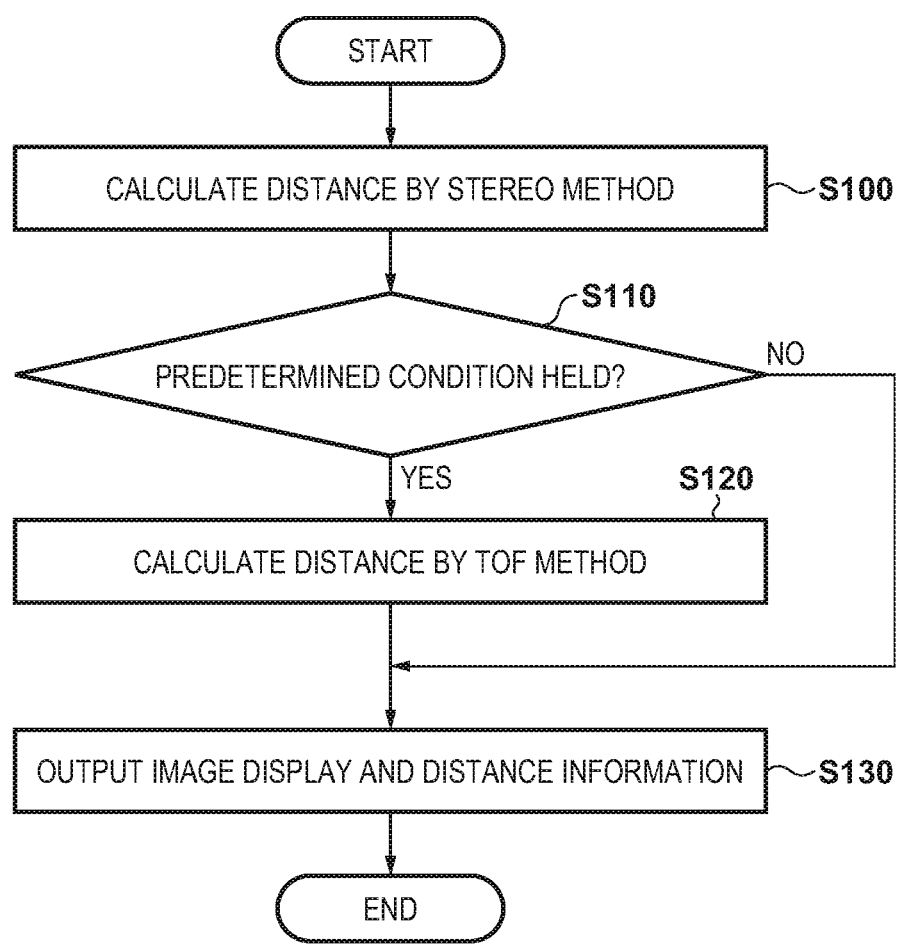
FIG. 6 is a flowchart for explaining an example of a control method at the time of image capturing.

FIG. 6 is a flowchart showing an example of a control method at the time of image capturing. First, in step S100 (to be simply referred to as "S100" hereinafter, and ditto for other steps), the distance calculation unit 121 calculates a distance by the stereo method. Then, in S110, the determination unit 123 determines whether a calculation result in S100 satisfies a predetermined condition. If this predetermined condition holds, the process advances to S120 in which the distance calculation unit 122 calculates the distance by the TOF method. If this predetermined condition does not hold, the process advances to S130. In S130, the display 14 displays an image, and the output unit 15 outputs distance information. The distance information output here is given according to the calculation result (the calculation result based on the stereo method) in S100 if the predetermined condition does not hold in S110 and is given according to the calculation result (the calculation result based on the TOF method) in S120 if the predetermined condition holds in S110.

As an example of the predetermined condition in S110, the fact that the luminance of the object is smaller than a predetermined reference value, the distance with the object is larger than a predetermined reference value, or the like is given. That is, in a case in which a shooting environment is comparatively dark or in a case in which a detection target (object) is positioned comparatively far, the distance information calculated based on the TOF method is adopted. In this embodiment, the process advances to S120 if one of these examples holds. As another embodiment, however, the process may advance to S120 if two or more, or all of these examples hold.

Figure 7:
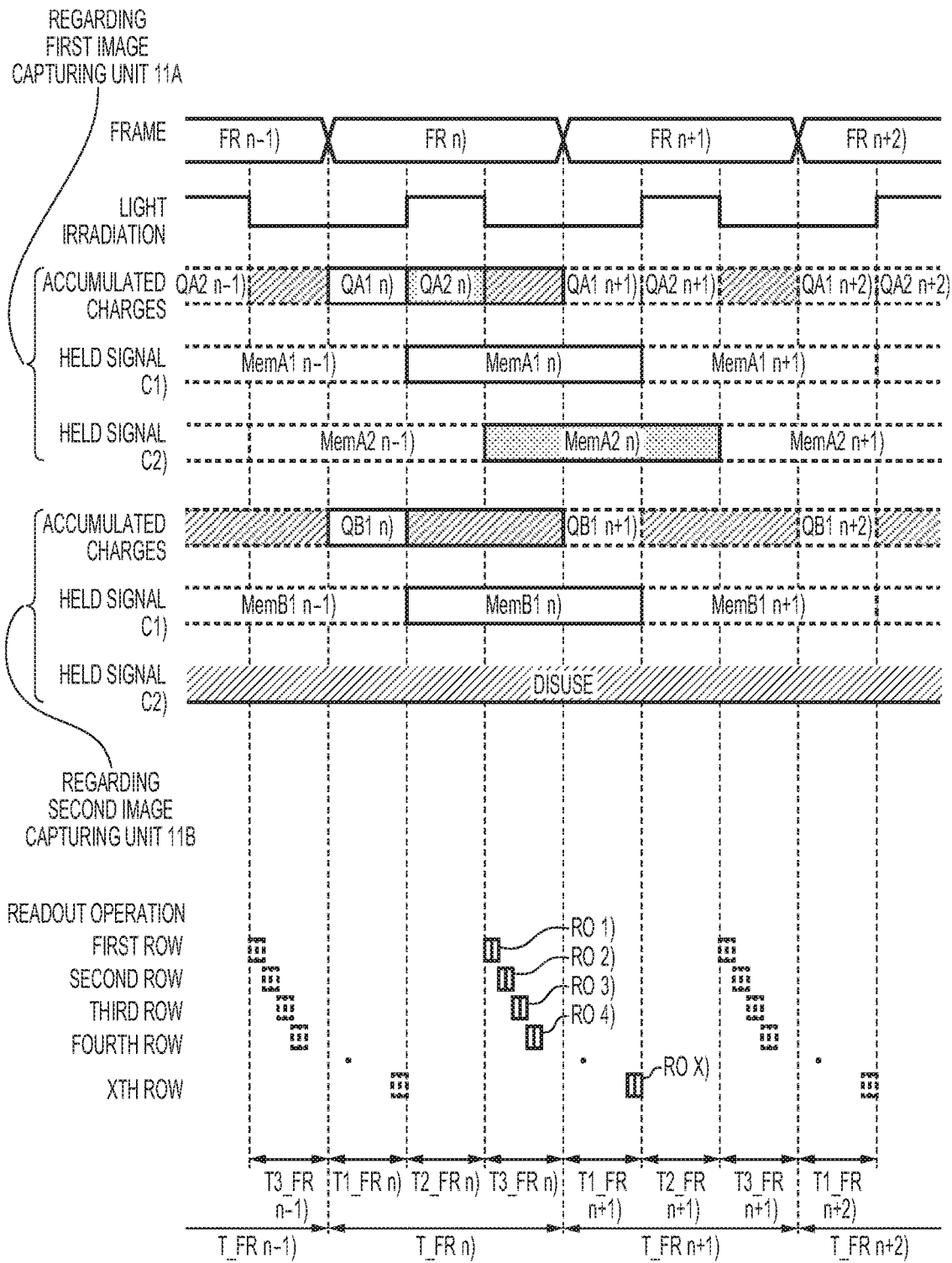
FIG. 7 is a timing chart for explaining an example of a method of driving pixels.

FIG. 7 is a timing chart showing an example of a method of driving pixels PX according to this embodiment as in FIG. 3 (see the first embodiment). The contents of an operation and control of the image capturing unit 11A are the same as in FIG. 3, and thus a description thereof will be omitted here.

Regarding the image capturing unit 11B, focusing on, for example, a period T_FR(n) corresponding to the data frame FR(n), the contents of the operation and control of the image capturing unit 11B in a period T1_FR(n) are the same as those of the image capturing unit 11A. That is, in the period T1_FR(n), charges QB1($n$) are accumulated in a photoelectric conversion element PD. Then, at the last timing in the period T1_FR(n), the signal MemB1($n$) corresponding to the accumulated charges QB1($n$) is held in a capacitor C1. On the other hand, in periods T2_FR(n) and T3_FR(n), charges are not accumulated in the photoelectric conversion element PD. More specifically, charges generated in the photoelectric conversion element PD in the periods T2_FR(n) and T3_FR(n) are ejected (discharged) by a transistor T_OFD. Therefore, in this embodiment, a capacitor C2 of each pixel PX in the image capturing unit 11B is not used. In FIG. 7, "disuse" is indicated for the "held signal (C2)" of the image capturing unit 11B.

Figure 8A:
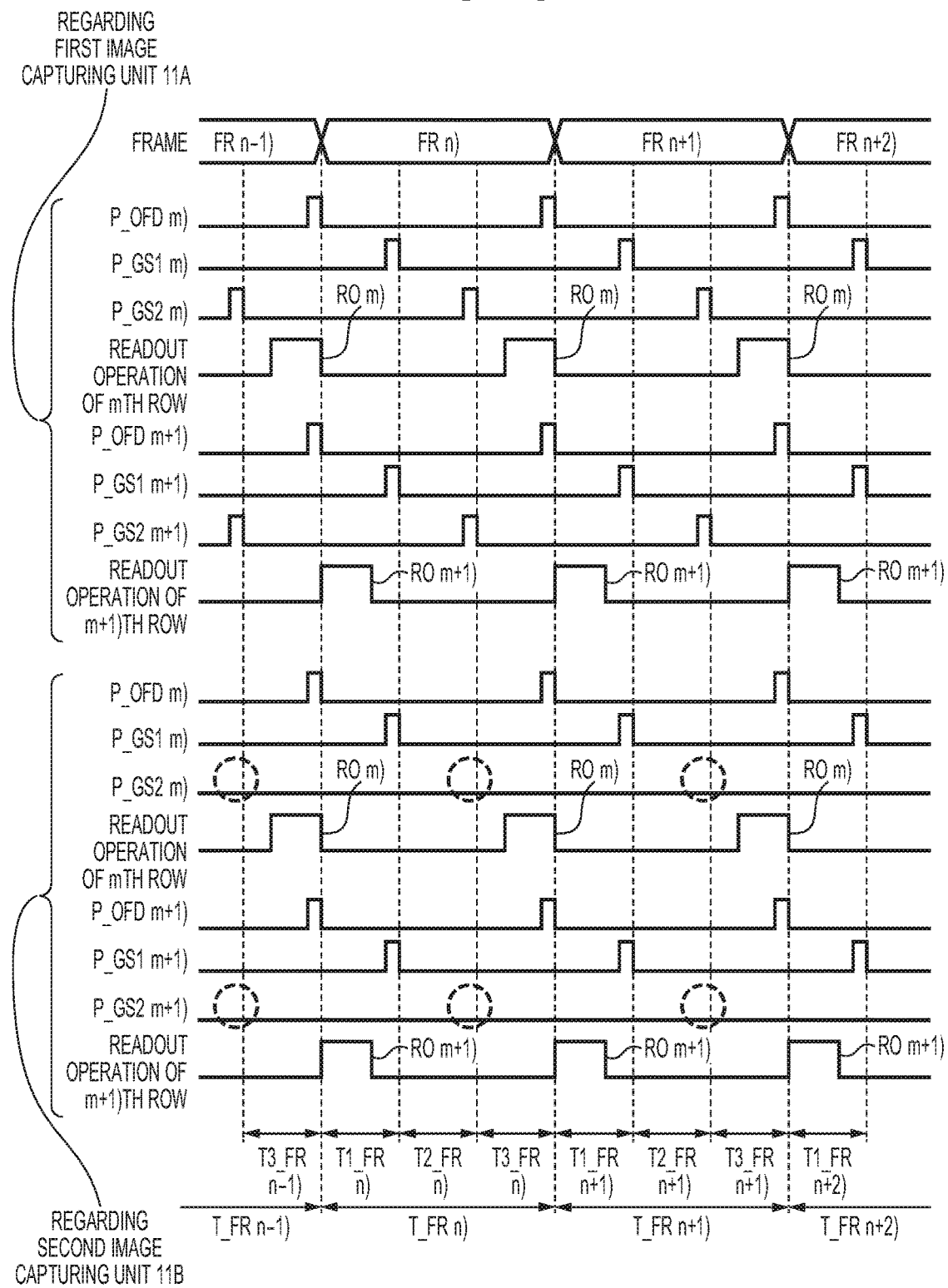

FIG. 8A shows a timing chart for explaining the method of driving the pixels PX in FIG. 7 in detail as in FIG. 4A (see the first embodiment). The contents of the operation and control of the image capturing unit 11A are the same as in FIG. 4A, and thus a description thereof will be omitted here.

Focusing on, for example, the period T_FR(n), the image capturing unit 11B is the same as the image capturing unit 11A except that a pulse at H level is not given to control signals P_GS2($m$) and P_GS2($m$+1) at the last timing in the period T2_FR(n). This also applies to other periods such as the period T_FR(n+1). In FIG. 8A, portions different from the case of the image capturing unit 11A (portions to which the above-described pulse at H level is not given) are indicated by broken lines.

That is, in this embodiment, the same operation as in the image capturing unit 11 described in the first embodiment is performed in the image capturing unit 11A. On the other hand, in the image capturing unit 11B, the charges QB1($n$) are accumulated, and the signal MemB1($n$) is held in order to obtain an image signal, and an operation and control to obtain a distance signal are omitted.

FIG. 8B shows a timing chart for explaining the method of driving the pixels PX when signal readouts RO(m) and RO(m+1) are performed in detail as in FIG. 4B (see the first embodiment). The contents of the operation and control of the image capturing unit 11A are the same as in FIG. 4B, and thus a description thereof will be omitted here.

Focusing on, for example, a period T_RO(m) corresponding to the signal readout RO(m) of the mth row, the image capturing unit 11B is the same as the image capturing unit 11A except for the following three points. First, a pulse at H level is not given to a control signal P_RES(m) at the last timing in a period T2_RO(m). Second, a pulse at H level is not given to a control signal P_TX2($m$) at the last timing in a period T3_RO(m). Then, third, sampling is not performed in periods T3_RO(m) and T4_RO(m). This also applies to other periods such as the period T_RO(m+1). In FIG. 8B, portions different from the case of the image capturing unit 11A (portions to which the above-described pulse at H level is not given and portions in which sampling is not performed) are indicated by broken lines.

That is, in this embodiment, an operation and control to obtain an image signal are performed in the image capturing unit 11B as in the image capturing unit 11A. On the other hand, an operation and control to obtain a distance signal are omitted.

According to this embodiment, in addition to being able to perform distance measurement based on the TOF method accurately as in the first embodiment, it is also possible to perform distance measurement based on the stereo method. That is, according to this embodiment, the processor 12 includes, as operation modes, the first mode in which distance measurement based on the stereo type is performed and the second mode in which distance measurement based on the TOF method is performed. Note that in this embodiment, a mode is exemplified in which the first mode is set in advance, and a shift from the first mode to the second mode is made if the predetermined condition in S110 holds. However, a mode may be possible in which the second mode is set in advance, and a shift from the second mode to the first mode is made if the predetermined condition does not hold. As described above, according to this embodiment, in addition to obtaining the same effect as in the first embodiment, it is possible to change a method of measuring the distance with the object in accordance with the shooting environment or the like and to calculate this distance more accurately.

Third Embodiment

The third embodiment will be described with reference to FIGS. 9 to 10B. This embodiment is different from the aforementioned second embodiment mainly in that an operation and control to obtain a distance signal are also performed in an image capturing unit 11B. That is, the image capturing unit 11B outputs a signal MemB2($n$) corresponding to a signal MemA2(n) of an image capturing unit 11A to a processor 12, in addition to the signal MemB1(n) described in the second embodiment.

FIG. 9 is a timing chart showing an example of a method of driving pixels PX according to this embodiment as in FIG. 7 (see the second embodiment). The contents of an operation and control of the image capturing unit 11A are the same as in FIG. 7, and thus a description thereof will be omitted here.

Regarding the image capturing unit 11B, focusing on, for example, a period T_FR(n), the contents of the operation and control of the image capturing unit 11B in periods T1_FR(n) and T2_FR(n) are the same as in FIG. 7. On the other hand, in a period T3_FR(n), charges QB2(n) are accumulated in a photoelectric conversion element PD. Then, at the last timing in the period T3_FR(n), a signal MemB2(n) corresponding to the accumulated charges QB2(n) is held in a capacitor C2. The period T_FR(n) further includes a period T4_FR(n) as a next period thereof. In the period T4_FR(n), charges are not accumulated in the photoelectric conversion element PD. More specifically, charges generated in the photoelectric conversion element PD in the period T4_FR(n) are ejected (discharged) by a transistor T_OFD.

Note that in this embodiment, signal readouts RO(1) to RO(X) can be performed between the period T4_FR(n) and a period T1FR(n+1).

In this embodiment, distance measurement based on a TOF method is performed by using both the signals MemA2(n) and MemB2(n). For example, the signal MemA2(n) becomes smaller, and the signal MemB2(n) becomes larger as a distance with an object increases and on the other hand, the signal MemA2(n) becomes larger, and the signal MemB2(n) becomes smaller as this distance decreases. Therefore, according to this embodiment, it is possible to improve the accuracy of distance measurement based on the TOF method by using both the signals MemA2(n) and MemB2(n).

In this embodiment, the period T2_FR(n) and the period T3_FR(n) are equal in time, and shorter than the period T1_FR(n). It is possible to increase a frame rate (the number of frame data that can be obtained per unit time) by shortening the periods T2_FR(n) and T3_FR(n). Together with this, the amount of irradiation light of a light irradiation unit 13 may be increased. This makes it possible to further improve the accuracy of distance measurement based on the TOF method.

Therefore, in addition to obtaining the same effect as in the second embodiment, this embodiment is further advantageous in calculating the distance with the object accurately and improving the frame rate.

Note that in the same procedure as in the first embodiment, signal components corresponding to a case in which the light irradiation unit 13 does not perform light irradiation may be removed from the signals MemA2(n) and MemB2(n) by using the signals MemA1(n) and MemB1(n). In this case, this calculation can be performed by using a coefficient corresponding to the ratio of the periods T2_FR(n) and T3_FR(n), and the period T1_FR(n).

Figure 10A:
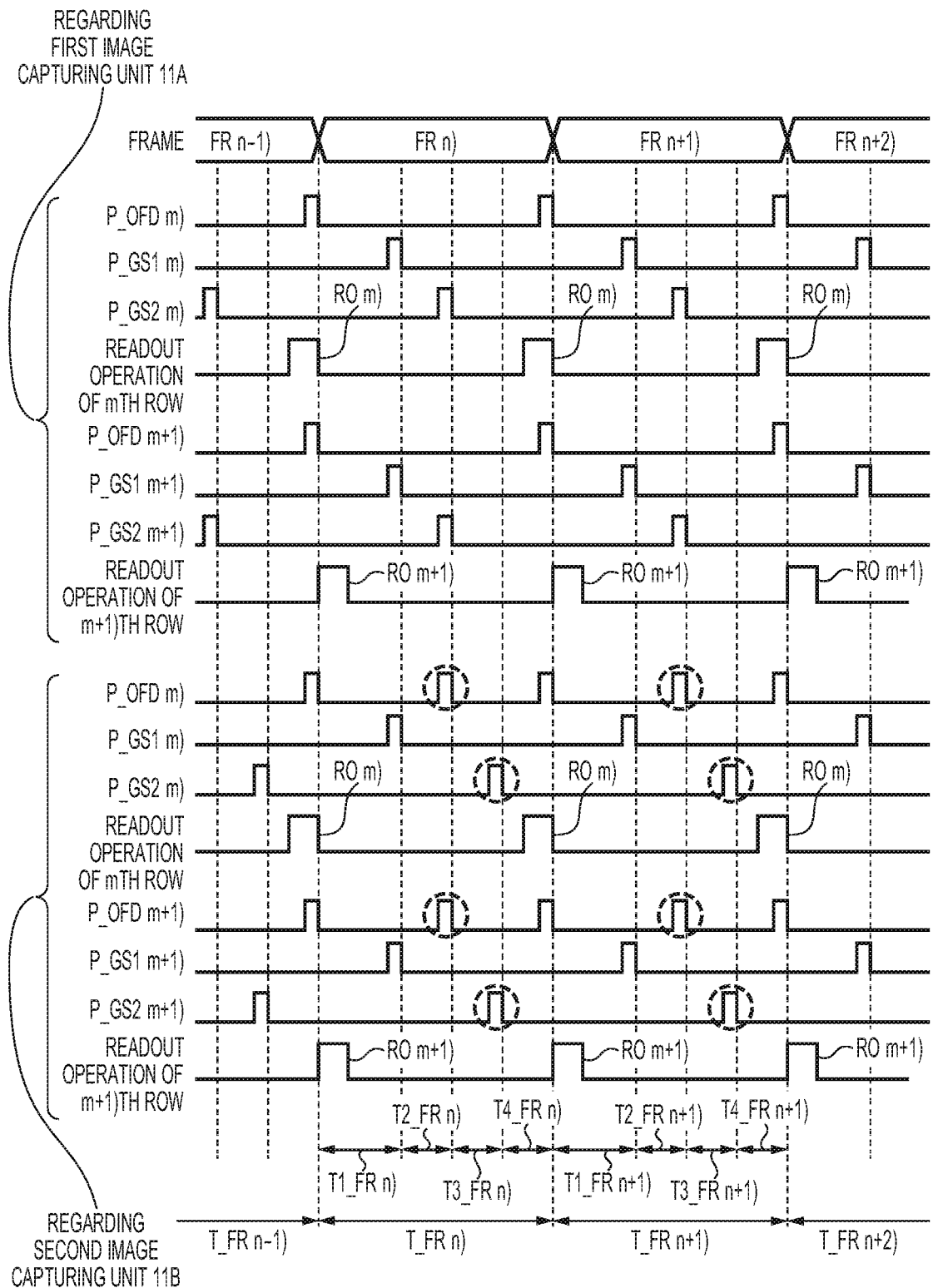
FIGS. 10A and 10B are timing charts for explaining the example of the method of driving the pixels.

FIG. 10A shows a timing chart for explaining the method of driving the pixels PX in FIG. 9 in detail as in FIG. 8A (see the second embodiment). The contents of the operation and control of the image capturing unit 11A are the same as in FIG. 8A, and thus a description thereof will be omitted here.

Regarding the image capturing unit 11B, focusing on, for example, the period T_FR(n), the same operation and control as those of image capturing unit 11A are performed in the period T1_FR(n). On the other hand, at the last timing in the period T2_FR(n), a pulse at H level is given to control signals P_OFD(m) and P_OFD(m+1). Consequently, charges generated in the photoelectric conversion element PD in the period T2_FR(n) are ejected (discharged) by the transistor T_OFD. Subsequently (after the control signal P_OFD(m) and the like are returned to L level), in the period T3_FR(n), charges are generated and accumulated again in the photoelectric conversion element PD. At the last timing in the period T3_FR(n), a pulse at H level is given to control signals P_GS2(m) and P_GS2(m+1). Consequently, the signal MemB2(n) corresponding to the accumulated charges QB2(n) in the period T3_FR(n) is held in the capacitor C2. This also applies to the other periods such as the period T_FR(n+1). In FIG. 10A, portions different from FIG. 8A (see the second embodiment) (portions to which the above-described pulse at H level is given) are indicated by broken lines.

Figure 10B:
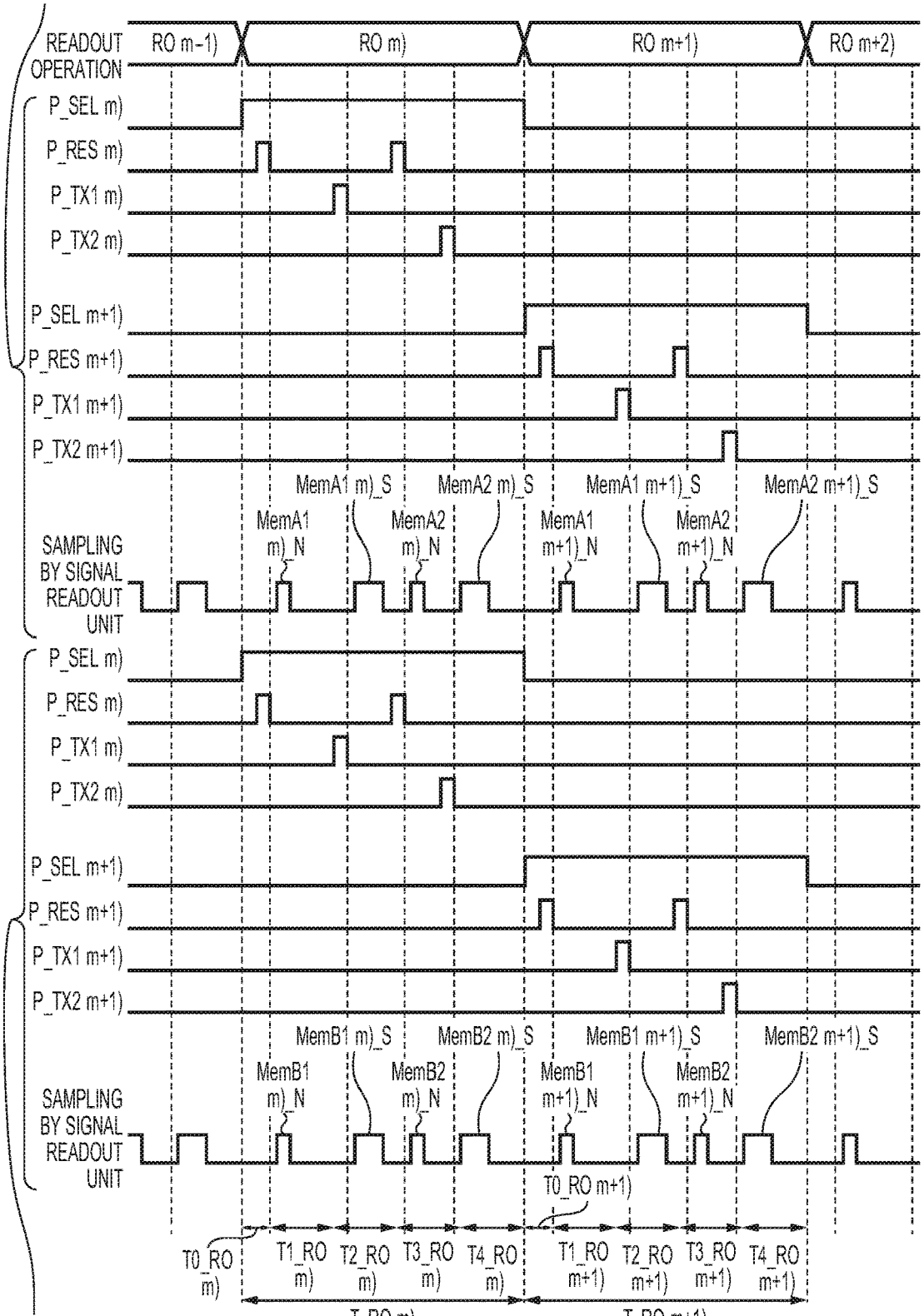

FIG. 10B shows a timing chart for explaining the method of driving the pixels PX when signal readouts RO(m) and RO(m+1) are performed in detail as in FIG. 8B (see the second embodiment). In this embodiment, the contents of the operations and control of the image capturing units 11A and 11B are the same as those of the image capturing unit 11A described with reference to FIG. 8B. That is, the operation and control to obtain image signals are performed in both the image capturing units 11A and 11B, and the operation and control to read out distance signals are also performed in both the image capturing units 11A and 11B.

As a modification, it is also possible to set the periods T1_FR(n), T2_FR(n), and T3_FR(n) to times (for example, a period Ta) equal to each other. That is:

$$T1\_FR(n)=T2\_FR(n)=T3\_FR(n)=Ta$$

According to this method, it is possible to perform distance measurement based on the TOF method with a comparatively simple arrangement. This will be described with reference to FIG. 13.

Figure 13:
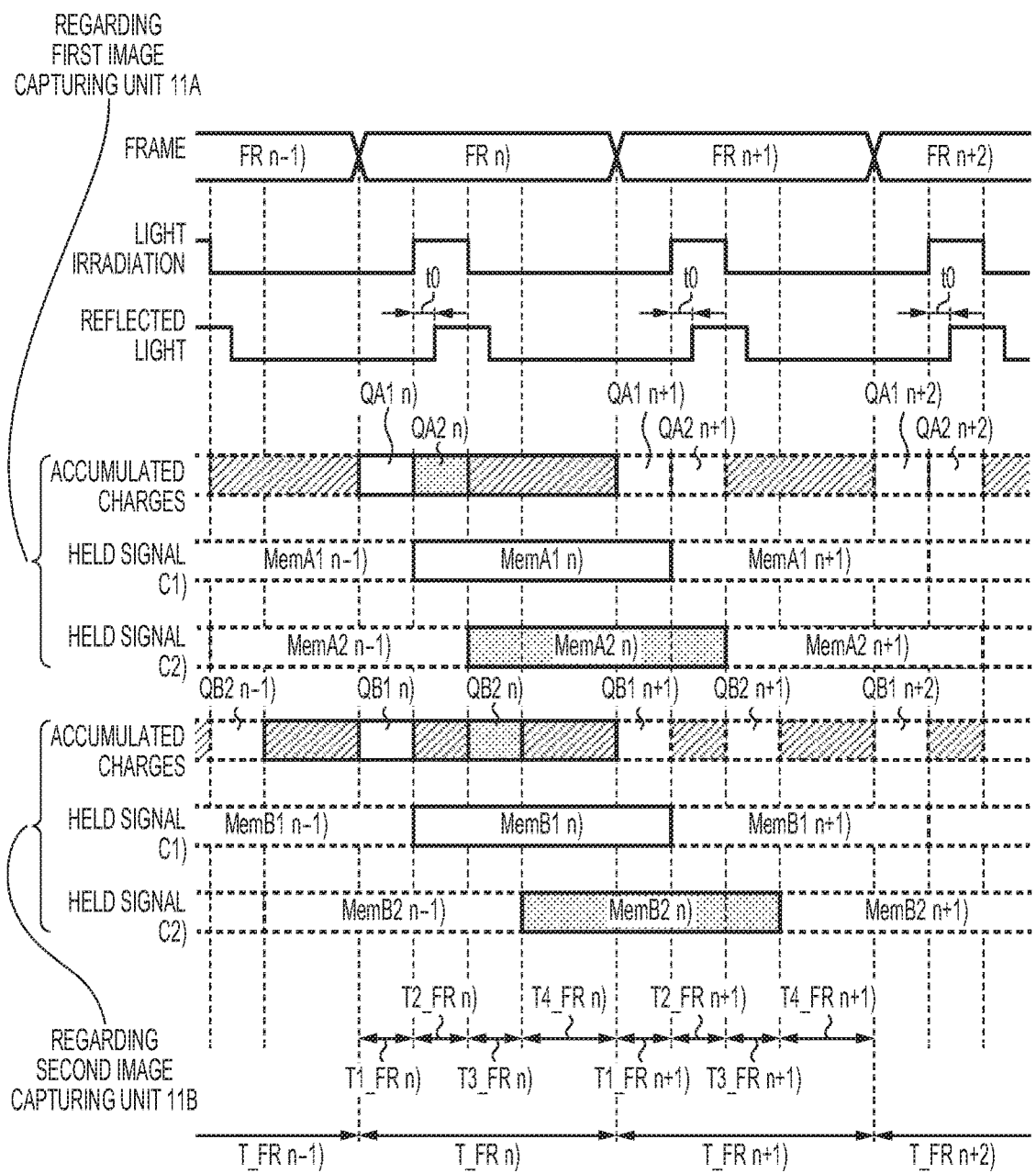
FIG. 13 is a timing chart for explaining an example of a method of implementing distance measurement based on a TOF method.

FIG. 13 is a timing chart for explaining an example of a method of the distance measurement based on the TOF method described above. A period of light irradiation by the light irradiation unit 13 matches the period T2_FR(n). As described above, however, reflected light from the object is detected with a delay by a time according to the distance with the object. As shown in FIG. 13, this delay time is denoted by a time t0.

At this time, the following equations hold. That is:

$$e0=e1+e2,$$

$$e1=e0\times(1-t0/Ta), \text{ and}$$

$$e2=e0\times(t0/Ta)$$

wherein e0: a total of signal components corresponding to the above-described reflected light, e1: a component corresponding to the above-described reflected light of the signal MemA2(n), and e2: a component corresponding to the above-described reflected light of the signal MemB2(n). That is, e1 is the component corresponding to the reflected light detected during the period T2_FR(n), and e2 is the component corresponding to the reflected light detected during the period T3_FR(n). Since:

$$T1\_FR(n)=T2\_FR(n)=T3\_FR(n),$$

it is possible to remove a component other than the components corresponding to the above-described reflected light from the signals MemA2(n) and MemB2(n). For example, e1 is calculated appropriately by obtaining a difference between the signals MemA1(n) and MemA2(n). Similarly, e2 is calculated appropriately by obtaining a difference between the signals MemB1(n) and MemB2(n).

From equations described above, the delay time t0 can be represented by:

$$t0 = Ta/(1 + e1/e2)$$

That is, the delay time t0 can be calculated based on Ta, e1, and e2. Therefore, according to this modification, it is possible to perform distance measurement based on the TOF method with the comparatively simple arrangement and to calculate the distance with the object appropriately even if, for example, the light reflectance of the object is not 1.

Fourth Embodiment

The fourth embodiment will be described with reference to FIGS. 11 to 12B. This embodiment is different from the aforementioned third embodiment mainly in that an operation and control to obtain a distance signal is performed (repeated) a plurality of times while obtaining frame data of one frame. More specifically, focusing on a period T_FR(n), in this embodiment, a series of operations in the periods T2_FR(n) and T3_FR(n) described with reference to FIGS. 9 to 10B is repeated K times (K>2).

Figure 11:
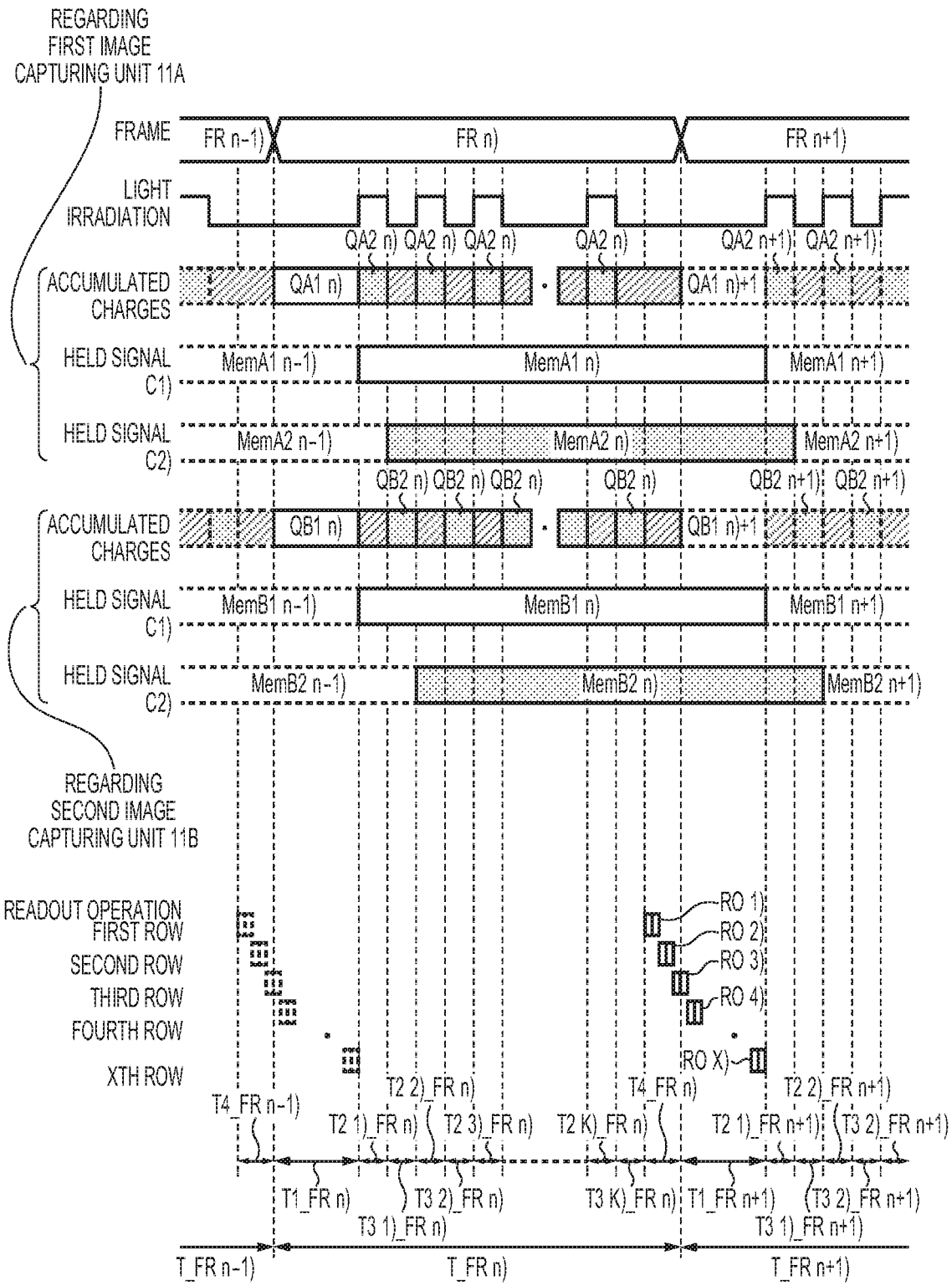
FIG. 11 is a timing chart for explaining an example of a method of driving pixels.

FIG. 11 is a timing chart showing an example of a method of driving pixels PX according to this embodiment as in FIG. 9 (see the third embodiment). Note that regarding the series of repeated operations described above, first periods T2_FR(n) and T3_FR(n) are, respectively, denoted by "T2(1)_FR(n)" and "T3(1)_FR(n)" in FIG. 11. The same also applies to periods after second periods (for example, Kth periods are denoted by "T2(K)_FR(n)" and "T3(K)_FR(n)").

According to this embodiment, it is possible to average errors of distance information and to further improve the calculation accuracy of a distance with an object, as compared to the third embodiment (that is, a case in which the series of operations described above is performed only once). It also becomes possible to further improve the calculation accuracy of the distance with the object by further shortening the individual periods of T2(1)_FR(n) to T2(K)_FR(n) and T3(1)_FR(n) to T3(K)_FR(n).

Figure 12A:
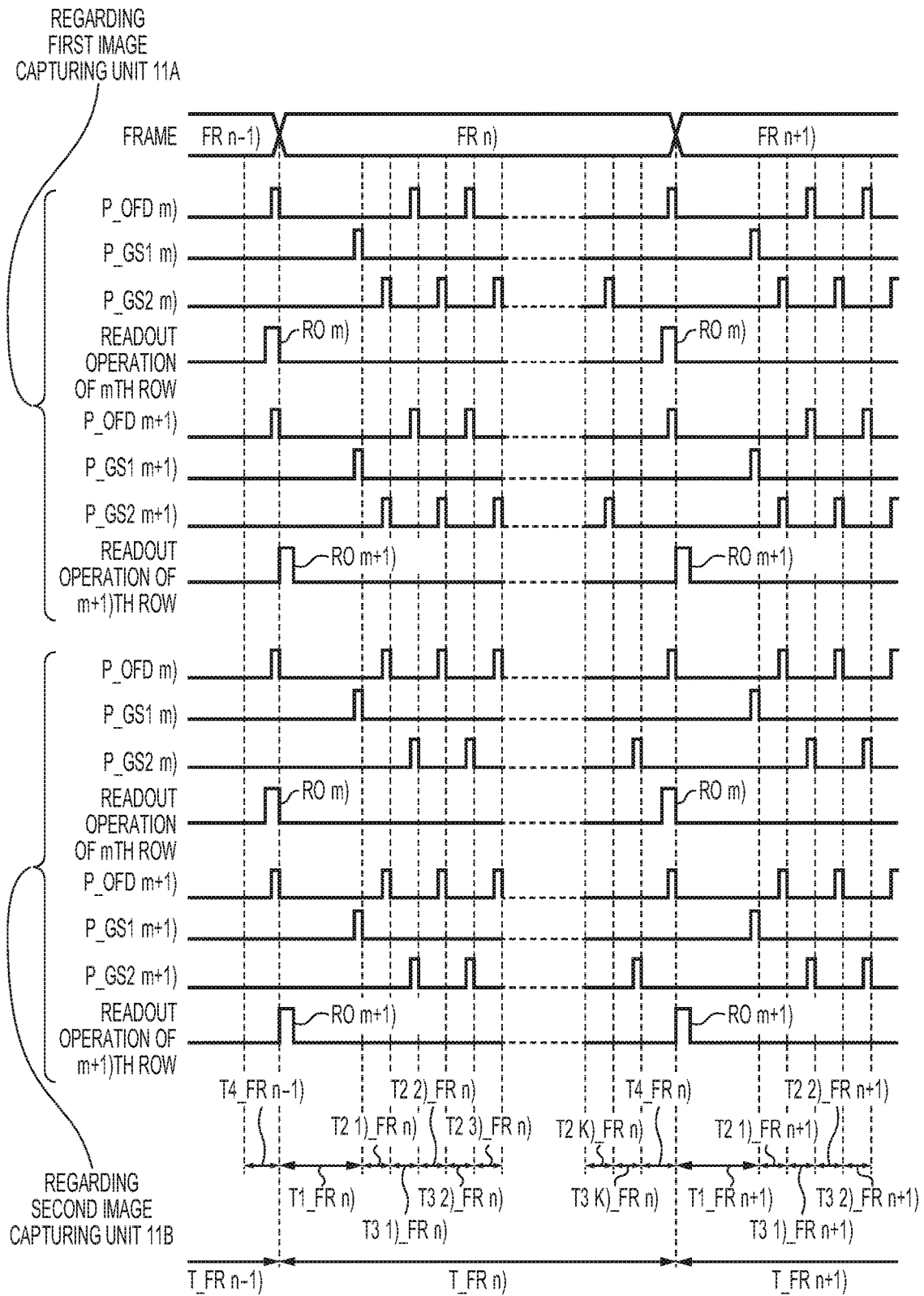
FIGS. 12A and 12B are timing charts for explaining the example of the method of driving the pixels.
Figure 12B:
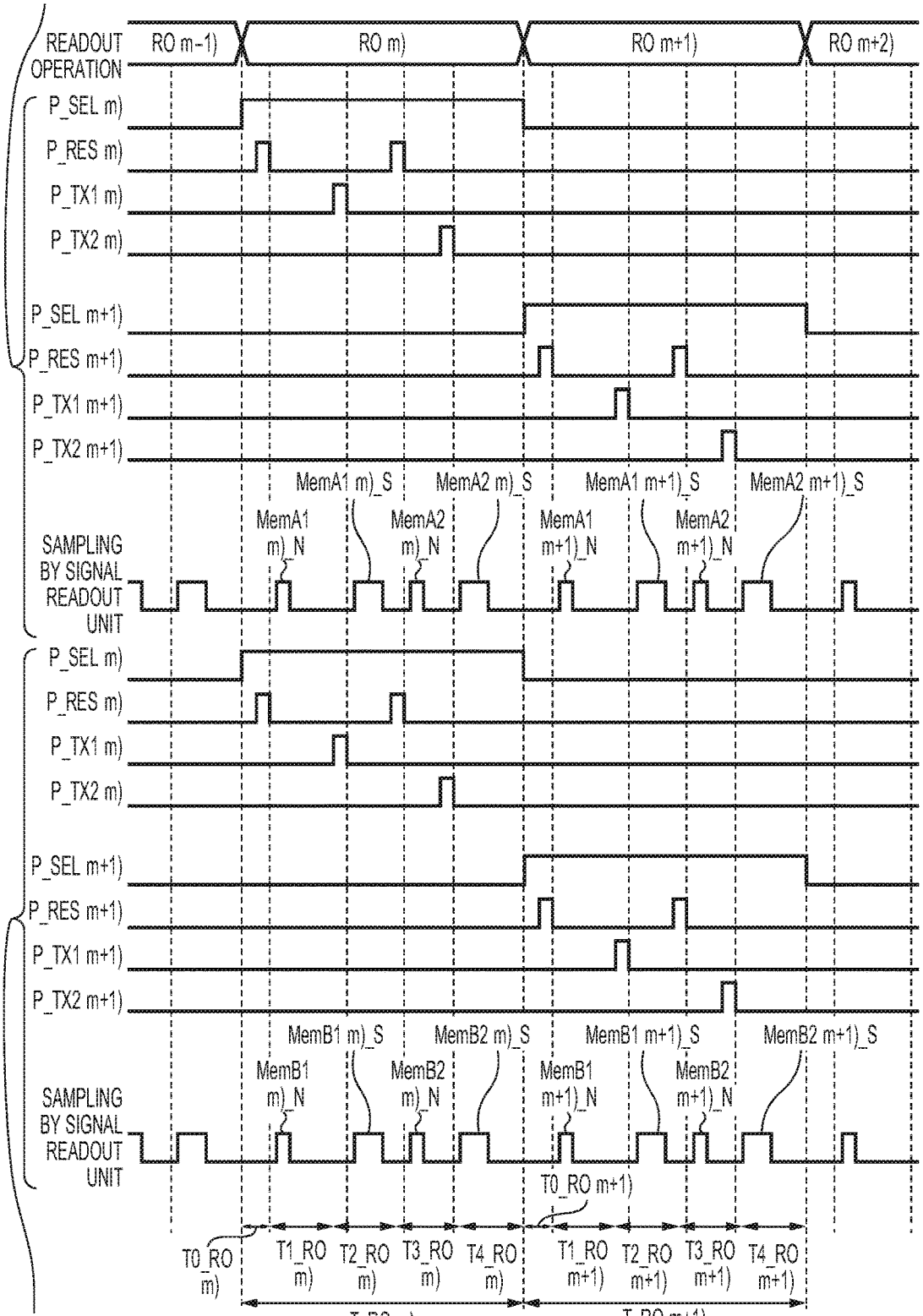

FIGS. 12A and 12B show timing charts for explaining the method of driving the pixels PX in detail as in FIGS. 10A and 10B (see the third embodiment). These timing charts are the same as those in the third embodiment except that the series of operations in the periods T2_FR(n) and T3_FR(n) of FIG. 10A is repeated K time (K>2). Note that also in this embodiment, signal readouts RO(1) to RO(X) can be performed between periods T4_FR(n) and T1_FR(n+1).

Fifth Embodiment

Figure 14A:
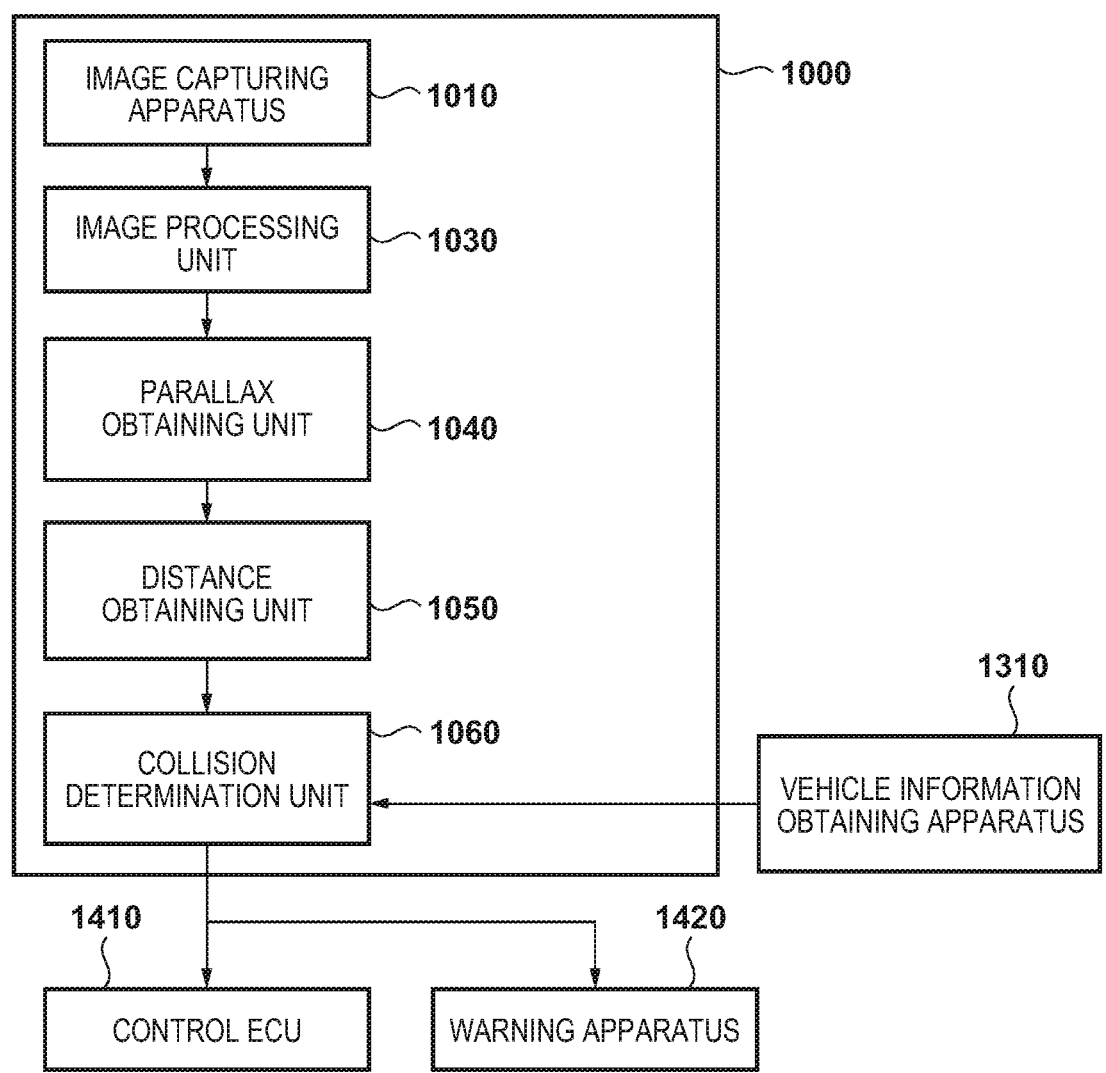
FIGS. 14A and 14B are block diagrams for explaining an example of an image capturing system regarding a vehicle-mounted camera.

FIG. 14A shows an example of an image capturing system regarding a vehicle-mounted camera. An image capturing system 1000 includes the image capturing apparatus in each embodiment described above as an image capturing apparatus 1010. The image capturing system 1000 includes an image processing unit 1030 that performs image processing on a plurality of image data obtained by the image capturing apparatus 1010 and a parallax obtaining unit 1040 that obtains a parallax (phase difference of parallax images) from the plurality of image data obtained by the image capturing system 1000.

If the image capturing system 1000 is in the form of a stereo camera that includes the plurality of image capturing apparatuses 1010, this parallax can be obtained by using signals output from the plurality of image capturing apparatuses 1010, respectively.

The image capturing system 1000 includes a distance obtaining unit 1050 that obtains a distance to a target based on the obtained parallax and a collision determination unit 1060 that determines whether there is a collision possibility based on the obtained distance. Note that the parallax obtaining unit 1040 and the distance obtaining unit 1050 are examples of a distance information obtaining means for obtaining distance information to the target. That is, the distance information is information about a parallax, a defocus amount, the distance to the target, and the like. The collision determination unit 1060 may determine the collision possibility using one of these pieces of distance information. The distance information obtaining means may be implemented by hardware designed for a special purpose, may be implemented by a software module, or may be implemented by a combination of these. Alternatively, the distance information obtaining means may be implemented by an FPGA (Field Programmable Gate Array), an ASIC (Application Specific Integrated Circuit), or the like. Alternatively, the distance information obtaining means may be implemented by a combination of the FPGA and the ASIC.

The image capturing system 1000 is connected to a vehicle information obtaining apparatus 1310, and can obtain vehicle information about a vehicle speed, a yaw rate, a steering angle, and the like. The image capturing system 1000 is also connected to a control ECU 1410 serving as a control apparatus that, based on a determination result in the collision determination unit 1060, outputs a control signal generating a braking force to a vehicle. The image capturing system 1000 is also connected to a warning apparatus 1420 that issues a warning to a driver based on a determination result in the collision determination unit 1060. For example, if there is the collision possibility as the determination result of the collision determination unit 1060, the control ECU 1410 performs vehicle control to avoid a collision or reduce damage such as braking, the release of an accelerator, suppression of an engine output, and the like. The warning apparatus 1420 warns a user by, for example, generating an alarm such as a sound, displaying warning information on a screen such as a car navigation system, or giving vibrations to a seatbelt and a steering.

In this embodiment, the image capturing system 1000 captures an image of the surrounding, for example, front side or back side of the vehicle.

Figure 14B:
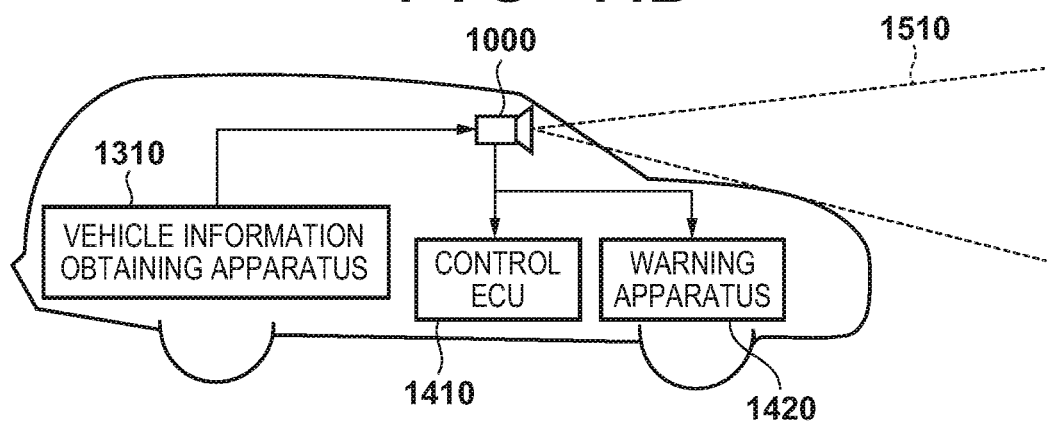

FIG. 14B shows an image capturing system when the image capturing system 1000 captures the image of the front side of the vehicle. The control that avoids a collision with another vehicle has been described above. However, the present invention is also applicable to control of automatic driving following another vehicle, control of automatic driving not to drive off a lane, or the like. Further, the image capturing system is applicable not only to a vehicle such as a four-wheel vehicle but also to, for example, a moving object (moving apparatus) such as ship, an airplane, or an industrial robot. Furthermore, the contents above are also applicable not only to the moving object but also widely to a device using object recognition such as an ITS (Intelligent Transportation System).

Other Embodiments

Several preferred embodiments have been described above. However, the present invention is not limited to these examples and may partially be modified without departing from the scope of the invention. For example, a known element may be added to a given embodiment, or a part of a given embodiment may be applied to another embodiment or deleted. Individual terms described in this specification are merely used for the purpose of explaining the present invention, and the present invention is not limited to the strict meanings of the terms and can also incorporate their equivalents.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-002115, filed on Jan. 10, 2017, which is hereby incorporated by reference herein in its entirety.

What is claimed is:

1. An image capturing apparatus that includes a first image sensor and a second image sensor each including a plurality of pixels arrayed in a matrix, a driving unit, and a signal readout unit,
wherein each of the plurality of pixels includes a photoelectric conversion element, a first signal holding unit, a first transferring unit configured to transfer a signal according to an amount of charges generated in the photoelectric conversion element to the first signal holding unit, a second signal holding unit, and a second transferring unit configured to transfer a signal according to an amount of charges generated in the photoelectric conversion element to the second signal holding unit, and
the driving units
perform, on each of the first image sensor and the second image sensor, first driving of causing the first transferring unit to transfer, to the first signal holding unit, a signal according to an amount of charges generated in the photoelectric conversion element in a first period in accordance with an amount of light from an object which is not irradiated with light by a light irradiation unit, and causing the first signal holding unit to hold the signal as an image signal,
perform, on the first image sensor, second driving of causing the second transferring unit to hold, in the second signal holding unit, a signal generated in the photoelectric conversion element in a second period based on reflected light from the object irradiated with the light by the light irradiation unit, and
perform, on the second image sensor, third driving of causing the second transferring unit to hold, in the second signal holding unit, a signal generated in the photoelectric conversion element in a third period based on reflected light from the object irradiated with the light by the light irradiation unit, the third period including a period which does not overlap the second period.

2. The apparatus according to claim 1, wherein a period from a start to an end of the second period does not overlap a period from a start to an end of the third period.

3. The apparatus according to claim 1, wherein the third period is a period after the second period,
the second period includes a period in which the light irradiation unit irradiates the object with the light, and the third period includes a period after the light irradiation unit finishes irradiating the object with the light.

4. The apparatus according to claim 3, wherein the second period includes a part of the period in which the light irradiation unit irradiates the object with the light, and
the third period includes another portion following the part of the period in which the light irradiation unit irradiates the object with the light.

5. The apparatus according to claim 1, wherein the plurality of pixels are arrayed so as to form a plurality of rows and a plurality of columns,
the signal generated in the photoelectric conversion element in the second period and the signal generated in the photoelectric conversion element in the third period are held in the second signal holding units of the respective pixels of the first image sensor and the second image sensor, respectively, as distance signals each indicating a distance between the object and the image capturing apparatus,
when the signal readout units read out the image signals, the driving units output the image signals from the respective pixels for each row, and the signal readout units read out the output image signals for each column, and
when the signal readout units read out the distance signals, the driving units output the distance signals from the respective pixels for each row, and the signal readout units read out the output distance signals for each column.

6. The apparatus according to claim 5, wherein each of the plurality of pixels includes a capacitance unit, a third transferring unit configured to transfer a signal of the first signal holding unit to the capacitance unit, and a fourth transferring unit configured to transfer a signal of the second signal holding unit to the capacitance unit,
after the first driving, the second driving, and the third driving, regarding each of the first image sensor and the second image sensor, the driving unit causes the third transferring unit to transfer the image signal held in the first signal holding unit to the capacitance unit, and then the signal readout unit reads out the image signal transferred to the capacitance unit, and
after the first driving, the second driving, and the third driving, regarding each of the first image sensor and the second image sensor, the driving unit causes the fourth transferring unit to transfer the distance signal held in the second signal holding unit to the capacitance unit, and then the signal readout unit reads out the distance signal transferred to the capacitance unit.

7. The apparatus according to claim 1, wherein in each of the first image sensor and the second image sensor, the driving unit repeats the second driving and the third driving alternately after the first driving.

8. The apparatus according to claim 5, further comprising a processor,
wherein the processor includes, as operation modes,
a first mode in which a distance between the object and the image capturing apparatus is calculated based on the image signals held in the first signal holding units of both the first image sensor and the second image sensor, and
a second mode in which the distance is calculated based on the distance signal held in the second signal holding unit of one of the first image sensor and the second image sensor.

9. The apparatus according to claim 8, wherein the processor calculates the distance between the object and the image capturing apparatus in the first mode if a predetermined condition is not satisfied, and calculates the distance in the second mode if the predetermined condition is satisfied, and the predetermined condition includes at least one of facts that luminance of the object is smaller than a predetermined reference value, and the distance between the object and the image capturing apparatus is larger than a predetermined reference value.

10. A moving object comprising:

an image capturing apparatus defined in claim 1;

a distance information obtaining unit configured to obtain distance information to a target from a parallax image based on a signal from the image capturing apparatus; and a control unit configured to control the moving object based on the distance information.

* * * * *